(12) United States Patent
Wright et al.

(10) Patent No.: US 12,413,428 B2
(45) Date of Patent: Sep. 9, 2025

(54) COMPUTER IMPLEMENTED METHOD AND SYSTEM FOR STORING CERTIFIED DATA ON A BLOCKCHAIN

(71) Applicant: nChain Licensing AG, Zug (CH)

(72) Inventors: Craig Steven Wright, London (GB); Chloe Ceren Tartan, London (GB); Alexander Tennyson Mackay, London (GB)

(73) Assignee: nChain Licensing AG, Zug (CH)

( * ) Notice: Subject to any disclaimer, the term of this patent is extended or adjusted under 35 U.S.C. 154(b) by 726 days.

(21) Appl. No.: 17/762,341

(22) PCT Filed: Sep. 4, 2020

(86) PCT No.: PCT/IB2020/058256
§ 371 (c)(1),
(2) Date: Mar. 21, 2022

(87) PCT Pub. No.: WO2021/059057
PCT Pub. Date: Apr. 1, 2021

(65) Prior Publication Data
US 2022/0368539 A1 Nov. 17, 2022

(30) Foreign Application Priority Data
Sep. 23, 2019 (GB) .................................... 1913704

(51) Int. Cl.
*H04L 9/00* (2022.01)
*H04L 9/32* (2006.01)

(52) U.S. Cl.
CPC ............... *H04L 9/50* (2022.05); *H04L 9/007* (2013.01); *H04L 9/3247* (2013.01); *H04L 9/3252* (2013.01)

(58) Field of Classification Search
CPC ........ H04L 9/50; H04L 9/3247; H04L 9/3252
(Continued)

(56) References Cited

U.S. PATENT DOCUMENTS

2017/0048209 A1* 2/2017 Lohe .................. G06Q 20/3829
2017/0346639 A1* 11/2017 Muftic .................. H04L 9/3247
(Continued)

FOREIGN PATENT DOCUMENTS

| WO | 2017145016 | 8/2017 | |
|---|---|---|---|
| WO | WO-2018138612 A1 * | 8/2018 | ......... G06Q 20/3825 |
| WO | 2019161412 | 8/2019 | |

OTHER PUBLICATIONS

PCT/IB2020/05825 International Search Report and Written Opinion dated Jan. 26, 2021.
(Continued)

*Primary Examiner* — Teshome Hailu
(74) *Attorney, Agent, or Firm* — Messner Reeves LLP

(57) ABSTRACT

A method of storing certified data on a blockchain is disclosed. The method comprises generating a first blockchain transaction (Tx1) having a first output (Output 3) containing a first public key of a first private/public key pair, comprising a first private key and a first public key, of a cryptography system, first data related to the first public key, and a first digital signature applied, by means of a second private key of a second private/public key pair, comprising a second private key and a second public key, of a cryptography system, to the first data and to the first public key. The first blockchain transaction is broadcast to the blockchain.

36 Claims, 18 Drawing Sheets

| Version number: | ⇒ X.509 standard version (version 3). |
|---|---|
| Serial number: | ⇒ Unique ID assigned to certificate. |
| Signature algorithm identifier: | ⇒ Public key algorithm the CA uses for its signatures. |
| Issuer name: | ⇒ A way to uniquely identify the issuing CA. |
| Validity period — Not before: / Not after: | ⇒ Expiration date after which certificate is not trusted - for security, certificates and subject public keys should be changed regularly. |
| Subject name: | ⇒ A way to uniquely identify the subject. |
| Subject public key info — Public key algorithm: / Subject public key: | ⇒ The public key & algorithm that the subject uses - not necessarily the same as the issuer. |
| Issuer unique Identifier: | |
| Subject unique Identifier: | ⇒ Other (optional) information the subject wants signed e.g. biometrics. |
| Extensions: | |
| Signature: | ⇒ Issuer's signature. |

(58) Field of Classification Search
USPC .......................................................... 713/156
See application file for complete search history.

(56) References Cited

U.S. PATENT DOCUMENTS

| | | |
|---|---|---|
| 2018/0091524 A1* | 3/2018 | Setty .................... H04L 9/3247 |
| 2018/0183587 A1 | 6/2018 | Won et al. |
| 2018/0359097 A1 | 12/2018 | Lindell |
| 2019/0036681 A1 | 1/2019 | Sundaresan |
| 2019/0066228 A1 | 2/2019 | Wright |

OTHER PUBLICATIONS

GB1913704.1 Combined Search and Examination Report dated Jun. 23, 2020.

* cited by examiner

| Version number: | | ⇒ X.509 standard version (version 3). |
|---|---|---|
| Serial number: | | ⇒ Unique ID assigned to certificate. |
| Signature algorithm identifier: | | ⇒ Public key algorithm the CA uses for its signatures. |
| Issuer name: | | ⇒ A way to uniquely identify the issuing CA. |
| Validity period | Not before: | ⇒ Expiration date after which certificate is not trusted - for security, certificates and subject public keys should be changed regularly. |
| | Not after: | |
| Subject name: | | ⇒ A way to uniquely identify the subject. |
| Subject public key info | Public key algorithm: | ⇒ The public key & algorithm that the subject uses - not necessarily the same as the issuer. |
| | Subject public key: | |
| Issuer unique identifier: | | |
| Subject unique identifier: | | ⇒ Other (optional) information the subject wants signed e.g. biometrics. |
| Extensions: | | |
| Signature: | | ⇒ Issuer's signature. |

FIGURE 1

| | |
|---|---|
| Prefix: | |
| Serial number: | |
| Issuer name: | |
| Issuer certificate location: | TxID: |
| | Vout: |
| Intermediate certificate location: | TxID: |
| | Vout: |
| Root certificate location: | TxID: |
| | Vout: |
| Validity period | Not before: |
| | Not after: |
| Subject name: | |
| Subject public key: | |
| Subject device identifier: | |
| Subject unique identifier: | |
| Extensions: | |

⇒ Prefix (4 bytes) identifying the digital certificate.

⇒ Unique ID (32 bytes) assigned to certificate.

⇒ CA's name (32 bytes).

⇒ Location of the issuer's certificate containing the issuer's CA public key. The data comprises a transaction ID (32 bytes) and output number (4 bytes).

⇒ Location of the intermediate certificate comprising a transaction ID (32 bytes) and output number (4 bytes).

⇒ Location of the Root certificate comprising a transaction ID (32 bytes) and output number (4 bytes).

⇒ Expiration date (8 bytes each) after which certificate is not trusted - for security, certificates and subject public keys should be changed regularly.

⇒ Name of person, group, company or other entity being certified (128 bytes). Encoded using ASCII.

⇒ Public key of the subject (32 bytes).

⇒ 4-byte identifier (optional) for the device that holds the certified private/public key ⇒ 32-byte identifier (optional) used by the issuing CA to represent the subject's identity.

⇒ Other (optional) information the subject wants signed e.g. biometrics, company logos, arbitrary messages (0-1024 bytes).

FIGURE 7

| Inputs | | Outputs | |
|---|---|---|---|
| Value | Script | Value | Script |
| $x$ BSV | $<PK_{CA}^{Issue}><SIG_{CA}^{Issue}>$ | $y$ BSV | 1. UTXO Registration: OP_DUP HASH160 $<PK_{CA}^{Issue}>$ OP_EQUALVERIFY OP_CHECKSIG |
| | | 0 BSV | 2. X.509 Digital Certificate: OP_RETURN$<CA \ll PK_A \gg>$ |

FIGURE 8

| Inputs | | Outputs | |
|---|---|---|---|
| Value | Script | Value | Script |
| $x$ BSV | $< Output\ 1\ from\ TxID_{CTX-PK_A}>$ | $y$ BSV | 1. *UTXO Registration:* OP_DUP HASH160 $< PK_{CA}^{Issue}>$ OP_EQUALVERIFY OP_CHECKSIG |
| | | 0 BSV | 2. *X.509 Digital Certificate:* OP_RETURN$< CA \ll PK_{A-new} \gg>$ |

FIGURE 9

| Inputs | | Outputs | |
|---|---|---|---|
| Value | Script | Value | Script |
| x BSV | < $Output\ 1\ from\ TxID_{CTX-PK_A}$ > | y BSV | 1. *UTXO Registration:* <expiry time> OP_CHECKLOCKTIMEVERIFY OP_DROP OP_DUP HASH160 < $PK_{CA}^{Issue}$ > OP_EQUALVERIFY OP_CHECKSIG |
| | | 0 BSV | 2. *X.509 Digital Certificate:* OP_RETURN < $CA \ll PK_{A-new} \gg$ > |

FIGURE 10

| PKI | Bitcoin blockchain PKI |
|---|---|
| Root certificate | OP_RETURN of TX1 |
| Root CA's name | OP_RETURN of TX1 |
| Signature for root certificate | Signature in Input 1 of TX1 |
| Signature for subordinate key | Signature in Input 1 of TX1 |
| Intermediate certificate | OP_RETURN of TX2 |
| Reference to Root CA | Input 1 of TX2 spends output 2 of TX1 |
| Signature for Issuing key | Signature in Input 1 of TX2 |
| Issuer certificate | OP_RETURN of TX3 |
| Reference to Intermediate certificate | Input 1 of TX3 spends output 2 of TX2 |
| Sub-fields within each certificate | Included in OP_RETURN payload data |

FIGURE 16

COMPUTER IMPLEMENTED METHOD AND SYSTEM FOR STORING CERTIFIED DATA ON A BLOCKCHAIN

CROSS REFERENCE TO RELATED APPLICATIONS

This application is the U.S. National Stage of International Application No. PCT/IB2020/058256 filed on Sep. 4, 2020, which claims the benefit of United Kingdom Patent Application No. 1913704.1, filed on Sep. 23, 2019, the contents of which are incorporated herein by reference in their entireties.

TECHNICAL FIELD

The present disclosure relates to a computer implemented method and system for storing certified data on a blockchain.

BACKGROUND

Introduction

Certificate authorities (CAs) ensure authenticity and rightful ownership of digital assets, linking public keys to user identities through the issuance of digital certificates. Digital certificates are an integral part of safe web browsing, enabling the secure exchange of sensitive information over the internet. An increasing proportion of commercial and social activity is happening in the digital space. For example, global retail e-commerce sales worldwide were $2.3 Trillion in 2017 and are projected to reach $4.8 Trillion by 2021 ["Global Retail E-Commerce Market Size 2014-2021," Statista, 2019, www.statista.com/statistics/379046/worldwide-retail-e-commerce-sales/]. This has only been made possible by widespread trust in safe web browsing underpinned by certificate authorities and digital certificates. Any commercial activity that involves the transfer of digital assets will require the same level of trust and cannot rely on cryptography alone.

Within the blockchain ecosystem, entities exchange value pseudonymously using private/public key pairs. There is no inherent requirement for entities to reveal their identities when interacting. Whilst this is a necessary privacy feature it presents obvious security risks for potential businesses and consumers. Currently, very few wallet software implementations and digital asset exchanges have strong enough know-your-customer (KYC) protocols to ensure that public keys can be securely linked to 'real world' identities. There has also been little progress on the development of industry wide standards for KYC or on-chain methods for identity management. As a result, payers and payees are restricted to using wallets managed by the same software of a centralised entity in order to be safe.

Blockchain architecture is strong enough to support on-chain issuance and management of identity certificates with no dependence on off-chain security protocols other than secure key management. Furthermore, the relatively low cost of reading blockchain data combined with its security and data integrity offers a significant economic advantage over existing methods for certificate providers.

Preliminaries
Digital Certificates

Digital certificates are used to certify the ownership of a public key. The X.509 is presently the standard format for public key certificates. FIG. 1 shows the data structure of the latest version (v3) alongside a description of each attribute. Digital certificates allow relying parties to trust signatures or assertions made about the private key corresponding to the certified public key.

The issuer, known as a certificate authority (CA), provides a signature in the last field of the certificate. The CA uses its private key to sign a message digest that is created from a hash of all the other fields in the X.509 standard, including an identifier for the hash algorithm. This signed digest appears as the final entry in the certificate.

The verification of a digital certificate is similar to the issuer signing process. The indicated hash algorithm is used to create a digest from all the fields in the certificate excluding the CA's signature. The CA's public key is then used to verify the signature at the end of the certificate to obtain the enclosed message digest. The certificate is deemed valid and not tampered with if the hash of all the fields is equal to the enclosed digest.

It should be noted that for every signature in the X.509 certificate, two public key algorithms are involved: the subject's public key that is protected by the CA and the algorithm with which the certificate is signed. These algorithms are independent of one another; the certified public key could belong to a 160-bit elliptic curve scheme while the certificate could be signed with an RSA 2048-bit algorithm, as described in greater detail below. [C. Paar and J. Pelzl, Understanding Cryptography, Berlin: Springer, 2010].

CA Ecosystem

A CA is an entity that issues digital certificates. The CA acts as trusted third party that is trusted by the subject (owner) of the certificate and the party relying upon the certificate. CAs most commonly sign certificates used in HTTPS (the secure browsing protocol for the World Wide Web), or issue identity cards by national governments for the electronic signing of documents [en.wikipedia.org/wiki/Certificate_authority].

CAs can be internal or external to an organisation. Commercial CAs charge to issue certificates; some common external CAs include Symantec (previously Verisign), Digicert, Comodo, Geotrust and Equifax [slideplayer.com/slide/4254412/]. Let's Encrypt [letsencrypt.org/getting-started/] is an open source CA and collaborative initiative backed by companies such as Mozilla, Cisco, Facebook, Chrome and many more. Although it offers high security, the drawback of free certificates is the lack of any warranty or additional features. A comparative review of the top CAs can be found in [premium.wpmudev.org/blog/ssl-certificate-authorities-reviewed/].

While smaller organizations tend to use managed/hosted CA services, government bodies and medium-large sized organizations often deploy their own internal CAs (e.g. Certificate Services in Windows Server or Google's Google Trust Services—GlobalSign Root CA-R2). In this case, the trust of the certificate is based on the organisation that issued it [sachi73blog.wordpress.com/2013/11/21/x509-certificate-asymmetric-encryption-and-digital-signatures/].

FIG. 2 illustrates the process of a client (subject) 2 submitting a certificate signing request (CSR) 4 to an external (commercial) CA 6 for the issuance of a digital certificate 8. The CSR contains the subject's name 10, public key 12 and algorithm used (the majority use RSA—as described in detail below). The public key 12 of a private 14—public 12 keypair 16 is created by the client 2 and the private key 14 is protected in a private key store 18. The public key 12 is submitted in a CSR 4 to the CA 6. The CA 6 verifies the client's identity and signs the client's public key 12 (with the CA's private key) using the X.509 format. The signed digital certificate 8 is then issued to the client 2.

Chain of Trust

The CA ecosystem is made scalable and trustworthy using a hierarchical chain of trust. A so-called Root CA acts as an anchor, forming the foundation of the chain. The Root CA distributes its certificate issuance load across Subordinate (intermediate) CAs, who in turn might distribute their load to Issuing CAs. It should be noted that there will usually be at least one intermediate certificate in a chain between the end-entity and the Root CA, but there can be more than one.

The CAs at the end of the branch interact with clients to issue the digital certificates. This hierarchical approach improves capacity, manageability and resilience of the ecosystem. Subordinate CAs allow for the segmentation of different organisational areas to support specialist functionality, different applications or to introduce regional separation. For instance, policy authorities (Policy CAs) could be established that operate in different legal jurisdictions [www.ncipher.com/resources/research-reports-and-white-papers/securing-your-pki]. The CA may also opt to use a Registration Authority (RA) that performs identity checks of an individual or organisation on behalf of the CA. It should be noted that RAs do not actually sign/issue any certificates [www.tutorialspoint.com/cryptography/public_key_infrastructure.htm].

FIG. 3 illustrates the certificate chain of trust resulting from a hierarchy of CAs. The Root CA self-signs a root certificate, verifying its identity as a CA. A Subordinate CA is certified through an intermediate certificate that is signed and issued by the Root CA. The former issues an end-entity certificate to certify the final CA in the chain (Issuing CAs). A relying party can choose to trust certificates at any level within the chain, such that they automatically trust all certificates further down the chain.

Key Management

PKI Ecosystem

A public key infrastructure (PKI) provides a scalable framework for cryptographic data security, encompassing the set of hardware, software, policies, processes and procedures required to create, manage, distribute, use, store and revoke digital certificates and pubic keys [www.ncipher.com/resources/research-reports-and-white-papers/securing-your-pki]. CAs act as the core component of a PKI by underpinning the security of this cryptographic framework through the hierarchical chain of trust. Applications of PKIs include SSL/TLS certificates for public facing websites, VPN, enterprise user authentication, device authentication, in cloud-based apps, email security and mobile authentication [www.ncipher.com/resources/research-reports-and-white-papers/securing-your-pki].

In an ideal world, there would exist one CA and thus one source of truth. Yet there are multiple CAs operating under different Root CAs and issuing digital certificates with their respective Root public keys. This leads to multiple PKIs. Consider the case that two subscribers, Alice and Bob, use different CAs; Alice uses Symantec and has a Symantec public key, while Bob uses Equifax and has an Equifax public key. Bob sends his digital certificate to Alice. Alice needs to validate Bob's certificate to extract his certified public key, although she does not possess the Equifax public key.

To resolve this, each Root CA must maintain certificates for all other Root CAs. Each CA can also keep other useful information from other CAs, such as revocation lists. FIG. 4 illustrates how PKIs are mapped between individual Root CAs. The double ended arrow indicates that X and Y have signed a certificate for each other [slideplayer.com/slide/4254412/].

A subscriber can therefore contact their CA to obtain the certificate containing the public key for another CA. In the example of Alice and Bob, Bob sends certificates Symantec<<Equifax>> and Equifax<<Bob>> to Alice. Alice validates Symantec<<Equifax>> using Symantec's public key and extracts the public key of Equifax to validate Equifax<<Bob>>. Alice is then able to extract Bob's certified public key. This process is known as certificate chaining.

Keypairs

Digital certificates are signed with one of the following algorithms:

Rivest-Shamir-Adleman (RSA) Algorithm—RSA is one of the first public-key cryptosystems and is the most widely used algorithm in digital certificates. Its security is related to the difficulty of large integer factorisation and therefore does not require a secure random number generator. RSA is faster for signature validation but is slower for signature generation compared to DSA [askubuntu.com/questions/363207/what-is-the-difference-between-the-rsa-dsa-and-ecdsa-keys-that-ssh-uses/363221.

Digital Signature Algorithm (DSA)—DSA is a US standard for digital signatures. It uses the same key sizes as RSA but is based upon a discrete logarithmic problem. The security of the algorithm relies upon the strength of the random number generator used to derive DSA is faster at creating signatures than RSA but is slower to validate them [askubuntu.com/questions/363207/what-is-the-difference-between-the-rsa-dsa-and-ecdsa-keys-that-ssh-uses/363221].

Elliptic Curve Digital Signature Algorithm (ECDSA)—ECDSA is an elliptic curve implementation of DSA that is computationally lighter due to its representation by (one of two) coordinates on an elliptic curve [askubuntu.com/questions/363207/what-is-the-difference-between-the-rsa-dsa-and-ecdsa-keys-that-ssh-uses/363221]. It is generally thought to be more secure than DSA although it shares the same sensitivity to the entropy of the cryptosystem [security.stackexchange.com/questions/178958/what-are-the-differences-between-the-rsa-dsa-and-ecdsa-keys-that-ssh-uses?noredirect=1&lq=1. Based on Elliptic Curve Cryptography (ECC), ECDSA provides the same level of security as RSA for smaller key sizes; an ECC 256-bit certificate is equivalent to a 3072-bit RSA key [www.digicert.com/ecc.htm]. These small but strong keys allow for efficient use of computational power since less data is transmitted in an ECC certificate for the same level of security. ECC certificates are therefore favourable for mobile platforms. The requirement for less CPU and memory also increases network performance. It should be noted that while ECC provides benefits in terms of computational efficiency, the verification of ECDSA signatures can be a computationally intensive task and may be slower than RSA on some devices[www.digicert.com/ecc.htm].

HD Wallets

Deterministic keys are private keys initialized from a single "seed" value [A. M. Antonopoulos, "Chapter 5," in *Mastering Bitcoin*, California, O'Reilly, 2017, pp. 93-98]. The seed is a randomly generated number that is used to generate a master private-public key pair. Deterministic keys are related to one another and are fully recoverable with the seed key. As shown in FIG. 5, a HD wallet 20 is the most common derivation method of deterministic keys. In HD wallets, a parent key in the form of a master key 22 is generated from a seed key 24 and in turn generates a sequence of children keys 26, which in turn derive a sequence of grandchildren keys 28, and so on. Further details on their derivation are given below. This tree-like structure, shown in FIG. 5, is a powerful mechanism for managing several keys in terms of security and recovery of keys. Users can create a sequence of public keys without the corresponding private keys. Since fewer secrets need to be stored, there is a lower risk of exposure. In addition, if keys are lost/corrupted then they can be recovered from the seed key 24.

Secret Value Distribution

A brief summary is provided of the technical specification described in international patent application WO 2017/145016 on secret value distribution between two parties, Alice and Bob.

1. Alice creates a message and hashes it.
2. Alice uses the hashed message to create a secondary private-public key pair via ECC addition.
3. Alice sends the hashed message to Bob, signed for by her secondary private key.
4. Bob validates Alice's signature.
5. Bob uses the hashed message to create a secondary private-public key pair via ECC addition.
6. Alice and Bob are now both able to calculate each other's secondary public keys.
7. Alice and Bob multiply their individual secondary private keys with each other's secondary public keys to derive a shared secret (commutative law).
8. Hashing the hashed message (and hashing the hash of the hashed message etc.) enables the creation of a hierarchy of shared secrets, where only the original message need be known.

It would be desirable to store digital certificates, for example of the type described above, on a blockchain.

SUMMARY

Thus, in accordance with the present disclosure there is provided a method as defined in the appended claims.

There may be provided a method of storing certified data on a blockchain, the method comprising:—
  generating a first blockchain transaction, wherein a first output of said first blockchain transaction contains first data based on a first public key of a first private/public key pair, comprising a first private key and a first public key, of a cryptography system, the first blockchain transaction contains a first digital signature signed by means of a second private key of a second private/public key pair, comprising a second private key and a second public key, of a cryptography system, and the first digital signature has an input containing second data related to said first public key; and
  broadcasting the first blockchain transaction to the blockchain.

There may be provided a method of verifying certified data stored in a blockchain transaction, the method comprising:
  identifying (i) first data based on a first public key of a first private/public key pair, comprising a first private key and a first public key, of a cryptography system and (ii) a first digital signature, stored in a blockchain transaction, wherein a first output of said blockchain transaction contains said first data, said first digital signature is signed by means of a second private key of a second private/public key pair, comprising a second private key and a second public key, of a cryptography system, and the first digital signature has an input containing second data related to said first public key; and
  verifying said first digital signature by means of said second public key.

There may be provided a method of sharing a public key of a cryptography system between a first participant and a second participant, wherein the first participant has a first private key of a first private/public key pair comprising the first private key and a first public key of a cryptography system having a homomorphic property, the second participant has a second private key of a second private/public key pair comprising the second private key and a second public key of the cryptography system, a first digital signature is signed by means of a third private key, the first digital signature has an input containing first data related to said first public key, a second digital signature is signed by means of the third private key, and the second digital signature has an input containing second data related to said second public key, the method comprising:
  determining, by said first participant, a common secret by means of said first private key and said second public key, wherein said common secret can also be determined by means of said second private key and said first public key; and
  determining, by said first participant, at least one further public key of the cryptography system based on the first public key and the common secret.

There may be provided a method of generating at least one private key of a cryptography system, wherein a first digital signature is signed by means of a second private key, and the first digital signature has an input containing first data related to a first public key of a first private/public key pair comprising a first private key and said first public key of a cryptography system having a homomorphic property, the method comprising generating at least one third private key of the cryptography system based on the first private key and a deterministic private key.

There may be provided a system, comprising:
  a processor; and
  memory including executable instructions that, as a result of execution by the processor, causes the system to perform any embodiment of the computer implemented method described herein.

There may be provided a non-transitory computer readable storage medium having stored thereon executable instructions that, as a result of being executed by a processor of a computer system, cause the computer system to at least perform an embodiment of the computer implemented method described herein.

BRIEF DESCRIPTION OF THE DRAWINGS

Various embodiments in accordance with the present disclosure will be described with reference to the drawings, in which:

FIG. 1 is a diagram of a data structure of a digital certificate;

FIG. 7 shows a data structure of a digital certificate stored on a blockchain;

FIG. 8 shows a blockchain transaction containing a digital certificate;

FIG. 9 shows an updated version of the blockchain transaction of FIG. 8;

FIG. 10 shows a time locked version of the digital certificate of FIG. 9;

FIG. 16 shows a comparison of fields of digital certificates stored off chain and stored on a blockchain;

DESCRIPTION OF EMBODIMENTS

Digital Certificates on Chain
CA Hierarchy

Figure 2:
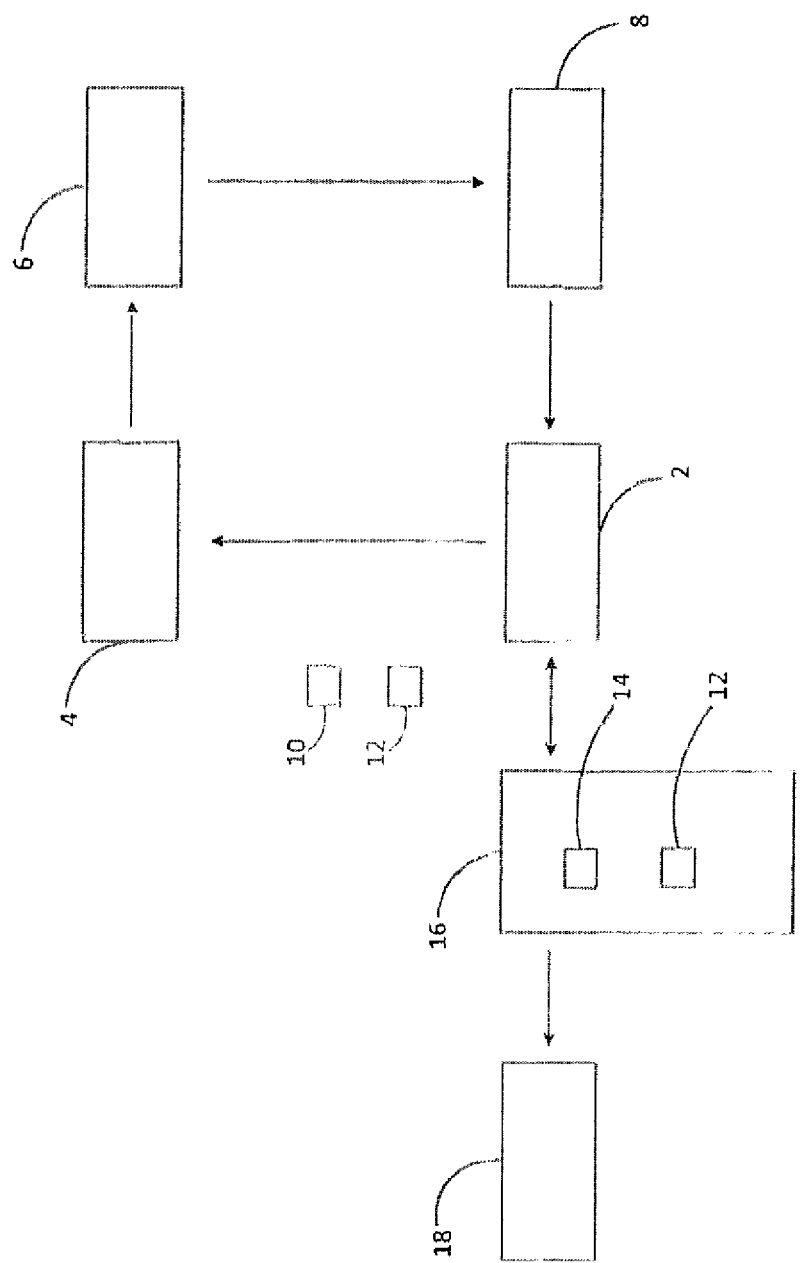
FIG. 2 shows a process for issuing a digital certificate.
Figure 3:
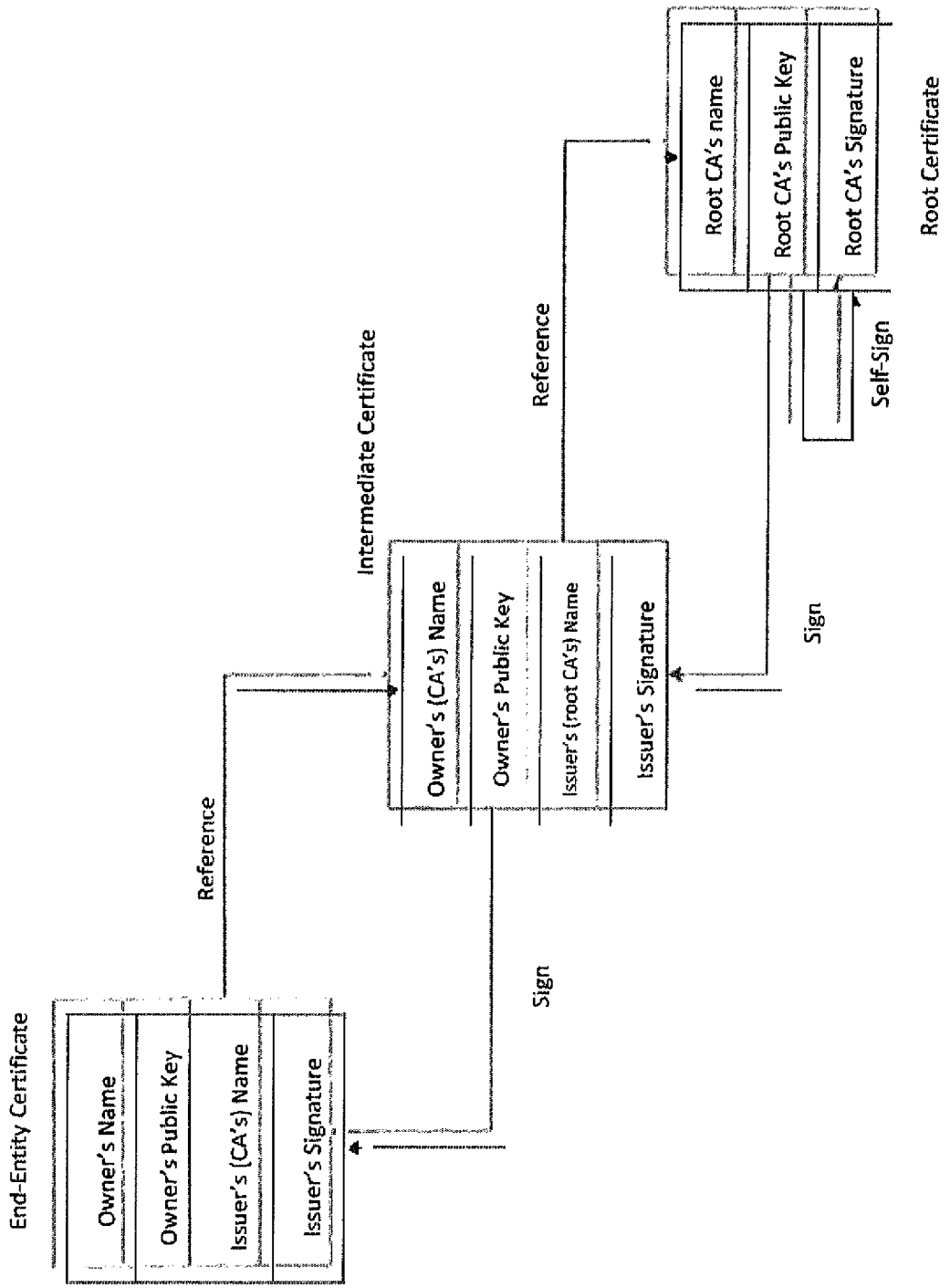
FIG. 3 shows a chain of trust in issuing a digital certificate.
Figure 4:
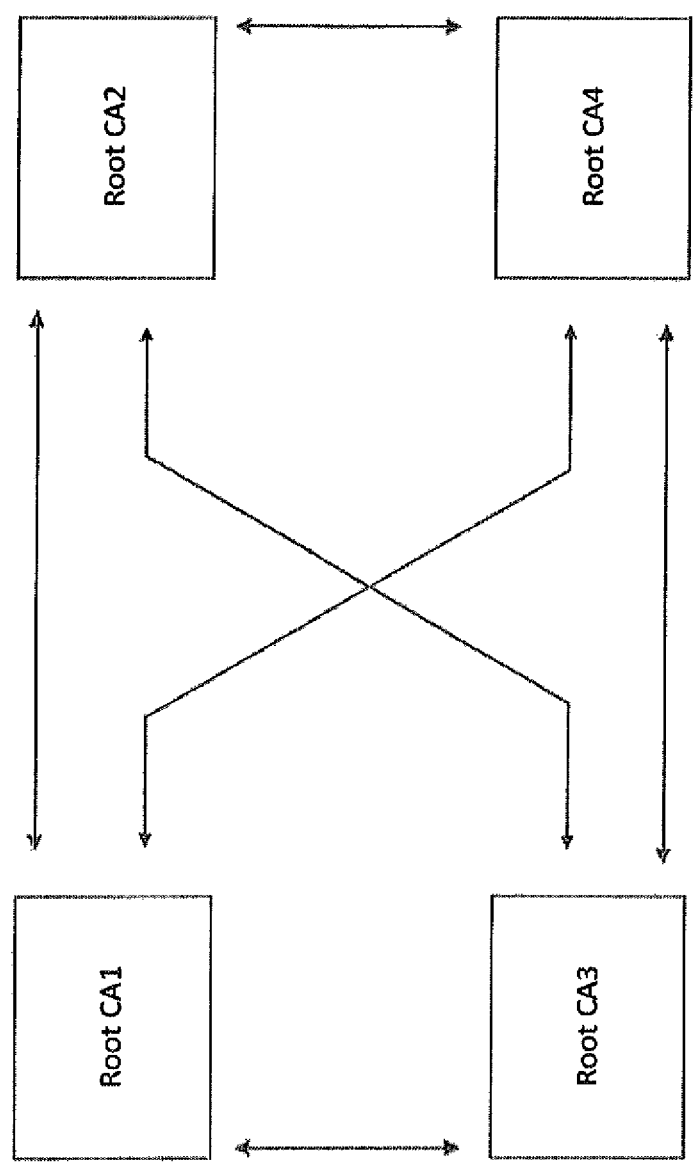
FIG. 4 shows mapping of public key infrastructure (PKI) between multiple root certification authorities.
Figure 5:
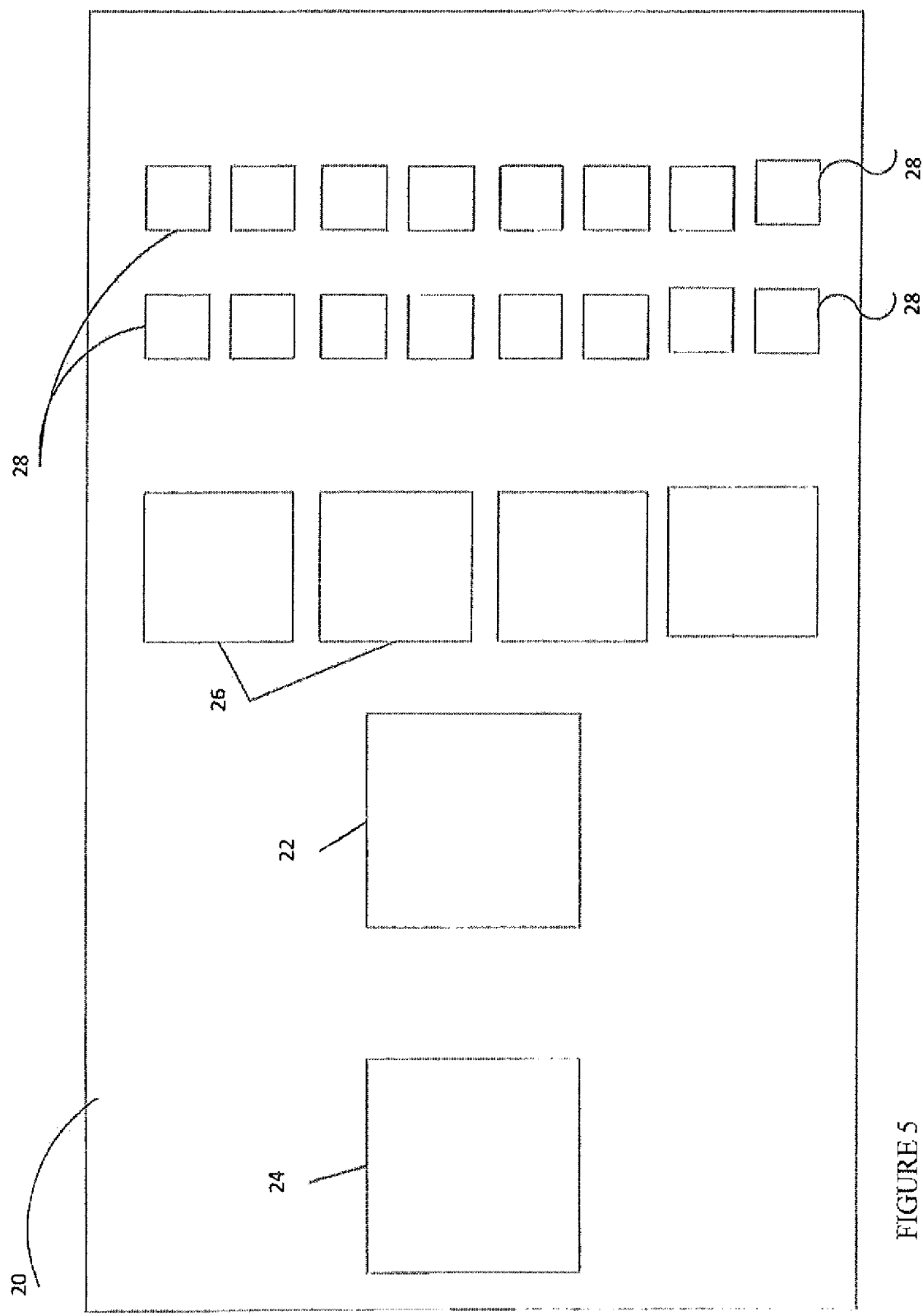
FIG. 5 is a diagram of a tree-like structure of deterministic keys in hierarchical deterministic (HD) wallets.
Figure 6:
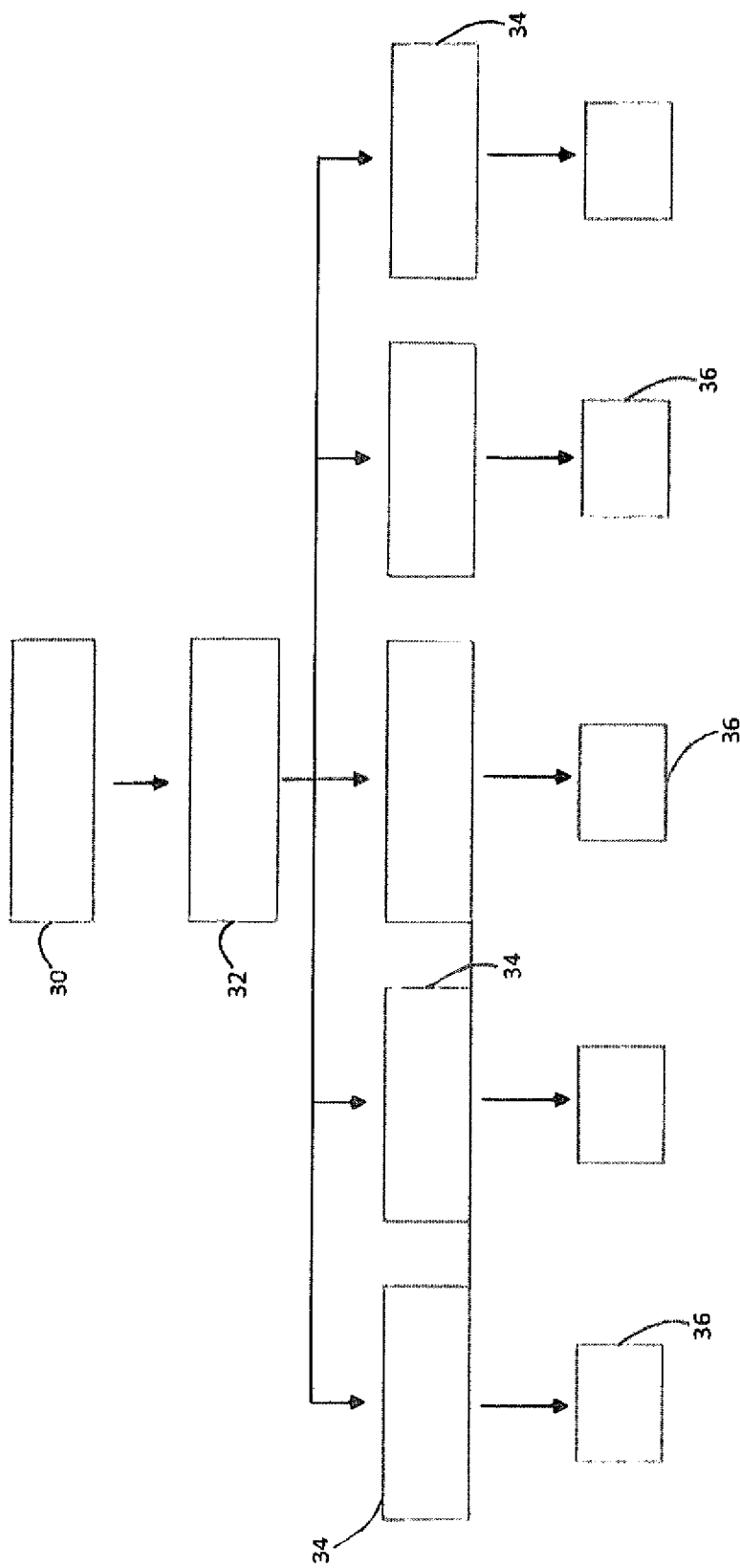
FIG. 6 shows storage of digital certificates on a blockchain.

Standard digital certificates of the format shown in FIG. 1 can be embedded on the blockchain. Here, a simplified two-tier CA hierarchy such as that shown in FIG. 6 can be assumed, in which a root CA 30 and one subordinate CA exists, such as a Policy CA 32 representing a single jurisdiction. The Policy CA 32 signs the public keys of multiple Issuing CAs 34 to form a chain of trust in accordance with FIG. 3. The Issuing CAs 34 interact with different users and devices, issuing digital certificates 36 on behalf of their parent CAs. In the following sections, the registration of a user's public key with a CA and resultant issuance of a digital certificate will be described. The verification, renewal and revocation of certificates are also considered.

Digital Certificates
Digital Certificate Format

Within the blockchain digital certificate protocol, the certificate metadata is contained within an OP_RETURN (provably unspendable) output of a transaction signed by the certificate issuer. The certificate data structure could be the same as the X.509 standard shown in FIG. 1 or modified to remove redundant data (i.e. information that is already inherent to the blockchain platform).

FIG. 7 shows an exemplary blockchain digital certificate. The proposed data structure is similar to the X.509 but with some notable differences. The significance of the new data structure is that it is a means of establishing a new standard to represent real world identities within the blockchain platform.

The first four bytes in the OP_RETURN payload is the digital certificate identification prefix. A device monitoring the blockchain will query that prefix when retrieving certificate data. Examples of the prefix include:

BDC: 0x4244430a
CER: 0x4345520a
BCT: 0x4243540a where the 3-letter abbreviation is converted to hex using ASCII.

A 32-byte unique ID is assigned to the certificate. This could be generated by hashing the concatenation of the remaining certificate data.

The certificate data begins with three fields identifying the CA on chain. These fields comprise of pointers to the CA's issuing, intermediate and root certificates, more details of which are given below.

The next two fields encode the certificate validity period.

The following four fields encode the certificate subject data and includes 'real-world' names, devices and a subject identifier (optional) used by the issuing CA.

The last two fields allow for additional unspecified metadata included in the certificate (optional).

It should be noted that the 'Signature' and 'Signature algorithm identifier' fields present in X.509 standard certificates are not explicitly contained in the blockchain certificate. This is because a signature field (based on ECDSA) already exists in the transaction input. Removing this redundant information enhances data storage efficiency on chain.

In total, the blockchain digital certificate requires 352-1408 bytes of OP_RETURN space.

Registration and Issuance

Let us assume Alice submits a CSR to a commercial CA off-chain. Subsequently, an RA acting on behalf of the CA carries out the necessary checks on Alice's identity. Once this information is verified and communicated to the Issuing CA, the latter responds by setting up an on-chain transaction in accordance with the following Setup algorithm.

Setup

Suppose that Alice would like her public key $PK_A$ for a digital signature scheme to be certified by CA.

1. Upon receiving a request from Alice on $PK_A$, CA verifies Alice's identity.
2. When CA is convinced that Alice is indeed who she has claimed to be, CA creates a transaction called certificate transaction (CTX):
   a. Input: CA's UTXO and an unlocking script containing a CA's signature
   b. Output 1: P2PKH (an independent public key chosen by CA, say $PK_{CTX}$)
   c. Output 2: OP_RETURN: $PK_A$
3. When the CTX is mined, CA provides Alice the transaction ID, $TxID_{CTX-PK_A}$.

The certificate on $PK_A$ is $TxID_{CTX-PK_A}$.

The so-called certificate transaction (CTX) is illustrated in FIG. 8, which shows a CTX with transaction ID, $TxID_{CTX-PK_A}$ created by a CA to certify the public key $PK_A$. The input to the transaction contains the Issuing CA's UTXO, thereby creating a link to the CA on-chain. The first output is a P2PKH (pay to public key hash) to an independent public key chosen by the Issuing CA. This output ensures that the CTX will appear in the UTXO set, and enables straightforward validity checks of Alice's public key (as described in below in relation to verification).

The second output in the Setup algorithm contains Alice's public key and her CA signed public key, both within an OP_RETURN provably unspendable output. Here, the algorithm is modified to include the entire digital certificate in the second output of the transaction. The certificate contains Alice's public key information along with the CA's signature in a standardised and recognised format within the OP_RETURN output. After the CTX in FIG. 8 is mined, the CA issues Alice with the transaction ID $TxID_{CTX-PK_A}$ in which her certificate is embedded. Alice can subsequently direct any relying parties wishing to verify her identity on-chain to this certificate transaction ID.

The public key $PK_A$ in the blockchain digital certificate be obfuscated by a hash function. This can be very useful for providing on-chain privacy, but still anyone who knows the public key off-chain can link it to the hash digest. This also allows the blockchain digital certificate to be more flexible than a standard digital certificate.

Verification

Alice's digital signature can be verified through her certified public key. The first part of the verification process adopts the following Verification algorithm, whereby an initial validity check is carried out by checking that the transaction ID exists within the UTXO set.

Verification

To verify a digital signature from Alice, a user needs to verify her public key first.

1. Given $PK_A$ and $TxID_{CTX-PK_A}$, one looks up $TxID_{CTX-PK_A}$.
2. Check the input of that transaction contains CA's public key.
3. Check whether the first output of that transaction is in the UTXO set. If not, reject $PK_A$ and halt.
4. Check the OP_RETURN output and parse the content as PK'.
5. Check whether PK'=$PK_A$. If not, reject $PK_A$ and halt
6. Accept $PK_A$.

To verify that the information provided within the second output certifies Alice's public key, the Verification algorithm needs to be extended to verify the content within the X.509 certificate. The updated algorithm is as follows:

1. Given $PK_A$ and $TxID_{CTX-PK_A}$, one looks up $TxID_{CTX-PK_A}$.
2. Check whether the first output of that transaction is in the UTXO set. If not, reject $PK_A$ and halt.
3. Check the OP_RETURN output and parse the content of the X.509 certificate excluding the CA's signature as Cert'.
4. Create a digest H(Cert') using the hash algorithm indicated by the identifier in the certificate.
5. Use $PK_{CA}$ to verify the signature at the end of the certificate and obtain the enclosed message digest H(Cert).
6. Check whether H(Cert')=H(Cert). If not, reject $PK_A$ and halt.
7. Accept $PK_A$.

Transactions on the blockchain platform are signed by their creators using the underlying elliptic curve cryptosystem. The CTX is digitally signed by the CA's private key; this makes the final entry of the X.509 certificate (the CA's Signature) redundant. Similarly, embedding digital certificates into blockchain transactions nullifies the field for Signature algorithm identifier within the X.509 standard, since all transactions are signed for using ECDSA. Thus, data embedded into a digital certificate can be optimised using cryptographic information that is inherent to the blockchain platform.

Renewal and Revocation

Digital certificates can be renewed and revoked according to the following processes for Revocation and Update.

Revocation

To revoke Alice's public key, CA spends the first output of the CTX that references $PK_A$, as this will cause Step 2 in the verification process to fail.

Update

There are scenarios where public keys need to be updated. For example, Alice has lost her private key, or her private key has been compromised.

Suppose Alice submits a new public key $PK_{A-new}$ to CA and CA is convinced that Alice is indeed who she claims to be.

1. CA creates a certificate transaction (CTX):
   a. Input: Output 1 from $TxID_{CTX-PK_A}$ and an unlocking script containing a CA's signature
   b. Output 1: P2PKH (an independent public key chosen by CA, say $PK_{CTX-new}$)
   c. Output 2: OP_RETURN: $PK_{A-new}$
2. When the CTX is mined, CA provides Alice the new transaction ID, $TxID_{CTX-PK_{A-new}}$.

For revocation, a CA can simply spend the first output of the CTX so that Step 2 in the Verification algorithm fails. To update digital certificates, a new CTX can be created that links to the previous CTX ID using the transaction input, as shown in FIG. 9 below, which shows a CTX with transaction ID $TxID_{CTX-PK_{A-new}}$ created by a CA to certify an updated public key $PK_{A-new}$ (x-y=Tx fee). It should be noted that there are different user cases where it may be desirable to tailor the revocation mechanism depending on CA, user or multi-party revocation schemes.

Certificate Expiry (Timed Keys)

Each digital certificate contains information about its period of validity, as shown in the data structure of FIGS. 1 and 7. By extracting this information, time can be added as a variable to the locking script of a certificate transaction (CTX) output thereby enhancing the functionality of the script to incorporate pseudo-autonomous certificate expiry/renewal.

Using OP_CHECKLOCKTIMEVERIFY (CLTV) the CTX containing the digital certificate can be made to expire by spending the transaction at a certain time. Time can be in UNIX or synchronised to block height sometime in the future. This means that any time-synced device can be validated/invalidated with a 'timed' key.

When a user submits a CSR to a commercial CA, they transfer the relevant payment for a certificate to remain valid until a certain time. By encoding this information in script (using nLockTime or CLTV), the signed CTX cannot be removed from the UTXO set (cannot be spent) until a certain amount of time has passed.

On Chain Method

FIG. 10 shows the CTX that accompanies the method outlined below. The transaction has transaction ID, $TxID_{CTX-PK_{A-new}}$ created by a CA to certify an updated public key $PK_{A-new}$ (x-y=Tx fee). The UTXO registration contains CLTV opcodes that ensure the UTXO cannot be spent until the certificate expiry date.

Step 1: The certificate issuer creates the certificate transaction CTX. The expiry date is encoded into the first output (the UTXO registration output) using the data <expiry time>.

Step 2: Once issued, the digital certificate is valid until the expiry date has been reached and the UTXO is spendable.

Step 3: Once the <expiry time> has passed, $PK_{CA}^{Issue}$ is able to spend the UTXO thereby revoking the certificate.

It should be noted that this method still requires active participation by the certificate issuer $PK_{CA}^{Issue}$ to ensure revocation.

Certified Wallets

A wallet is a collection of keys/addresses. A typical blockchain user regularly updates their addresses so that all their funds are not located in one place and that their private keys are not repeatedly used to generate transaction signatures. Most (secure) wallet software implementations will automatically generate a sequence of single-use keys without input from the user. Given this application layer constraint it is impractical to require a CA to sign every single key that an end-user may require day-to-day.

Instead, a single digital certificate can be issued for an entire wallet by issuing certificates for a public key which will not directly be directly used in transactions, but instead used in the derivation path for wallet addresses.

Hierarchical Keys

So far, the implementation of digital certificates to certify individual keypairs on the blockchain has been demonstrated. For security reasons, it is highly advisable to renew and refresh keys periodically in order to prevent compromising a user's funds. A common method for a blockchain user to manage and update their keys is through the use of hierarchical keys in HD wallets (defined above). It is important to highlight the distinction between the hierarchy in a PKI and the hierarchy in HD wallets; the former is established through digitally signed keys (starting from the Root CA key), while the latter is created through the deterministic generation of hierarchical keys (starting from a master key).

When sharing keys between two parties, use of the secret value distribution technique described in international patent application WO 2017/145016 may additionally be considered. This method describes how to setup a hierarchy of shared keys that are secret (known only to the two parties involved) and is an efficient method to generate secrets from an original shared secret. Again, the distinction between the hierarchy in a PKI and the hierarchy of secret keys that are created from sequential hashes of the original shared secret is highlighted.

Given these subtle differences, the different techniques can be combined to extrapolate desirable features of a parent (master or Root) key in a system of hierarchical keys, for the same amount of work. For example, HD wallets exploit the homomorphic property of ECDSA keypairs on-chain. This property can be further exploited by inferring the certification of all child/grandchild keys from a certified master key within a HD wallet. This can also be extended to a hierarchy of shared secret keys. This implicit quality of hierarchical keys is demonstrated below by introducing the concept of certified wallets.

Deterministic-Based Key Updates

Method:

1. Suppose Alice owns a deterministic wallet. She registers a public key $P_{CA}^A$ with a CA. The method for how $P_{CA}^A$ is registered and issued a digital certificate is described above. Alice may freely broadcast $P_{CA}^A$. She will never create a signature using $P_{CA}^A$.
2. Using the deterministic wallet design, she creates child keys $$P_{A1} = P_{CA}^A + P_1'$$
$$P_{A2} = P_{CA}^A + P_2'$$
$$\vdots$$

Here $P_1'$, $P_2'$, ... are deterministic keys based on a seed known only to Alice. The private keys are also related $sk_{A1} = sk_{CA}^A + sk_1'$.

3. Alice makes payments using $P_{A1}$, $P_{A2}$, ... by signing transactions. She only ever uses one signature per public key.
4. If anyone challenges Alice's key $P_{A1}$, she can prove that $P_{A1} = P_{CA}^A + P_1'$ and that she knows the private key of $P_1' = S_1' \cdot G$ by providing a signature Sig $P_1'$. Note this must be a different message to that signed by $P_{A1}$. The two signatures for $P_{A1}$ and $P_1'$ prove that Alice knows the private key corresponding to $P_{CA}^A$.

Features:

Alice only requires one public key to be certified by the CA. All other keys can be provably linked.

$P_{CA}^A$ can be freely broadcast to the network. It is never used to sign a transaction.

Deterministic wallet conventions have been used as an embodiment of the disclosure. However, it is not restricted to this. All that is required is that $$P_{A1} = P_{CA}^A + P_1'$$

where $P_1 = S_1' \cdot G$ private key is known to Alice.

Using the decomposition $P_{A1} = P_{CA}^A + P_1'$ can be verified in script, allowing for interesting spending conditions.

Certified Key Updates

The method for providing deterministic-based key updates described above can be extended to HD wallets. Instead of using $P_1'$, $P_2'$, ... as the base set of deterministically derived keys, the base set is a wallet derived, for example, using the BIP0032 protocol. The method for certifying a wallet is simply to add the certified public key to every key generated by the HD wallet $$P_i = P_{CA}^A + P_i'$$

where $P_i = sk_i \cdot G$.

HD Wallets

The user first chooses a seed, S, normally a 12-word phrase. The master node (or master private key) is then derived from the seed using between 1 and 50,000 rounds of HMAC-SHA512. From the master key all wallet addresses are generated $$sk_{i,j}' = H(m\|i\|j)$$

where i represents the account number, j represents the key number and H is the SHA256 hash function (for more detail on key derivation methods see [github.com/bitcoin/bips/blob/master/bip-0032.mediawiki]). Corresponding public keys are calculated by multiplying the private keys by the secp256k1 generator $$P_{i,j}' = sk_{i,j}' \cdot G$$

Certified HD Wallets

In order to certify a wallet, the user simply needs to add $sk_{CA}$ to every key in the wallet. The new certified keys are of the form $$sk_{i,j} = sk_{i,j}' + sk_{CA}$$

With corresponding public keys $$P_{i,j} = sk_{i,j} \cdot G$$

Figure 12:
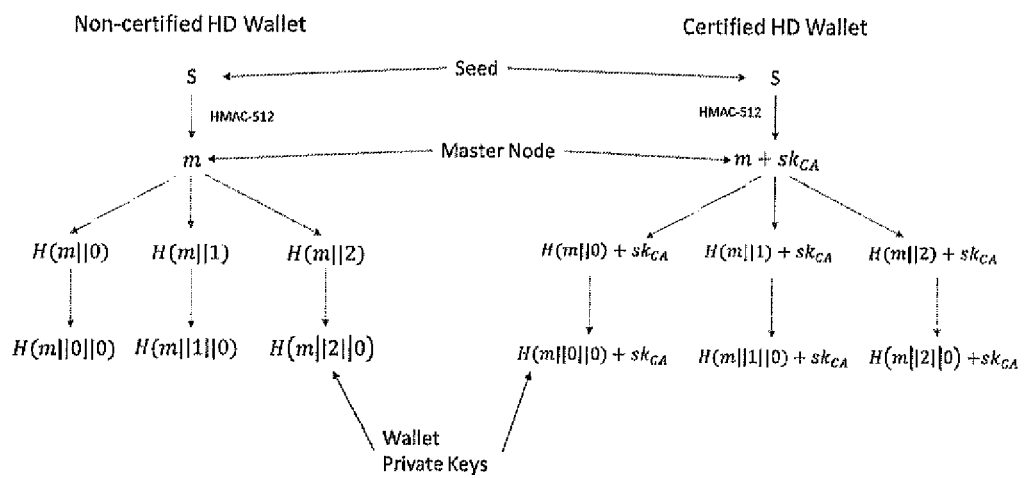
FIG. 12 shows derivation of private keys for certified HD wallets.

FIG. 12 shows the derivation path for a certified HD wallet. To prove ownership of the certified key, the user of the HD wallet can follow Step 4 in the deterministic-based key update process described above signing messages from corresponding $P_i$ and $P_i'$. Or alternatively the zero-knowledge proof protocol can be followed as described above.

Analysis

This method enables keys from a certified wallet to be cryptographically linked to a public key that has been issued a digital certificate. The key features of this method are that The certified key is protected The requirements on the CA are minimal Furthermore, the requirements on the end-user are also minimal as certifying an entire wallet only requires adding a constant to wallet private keys. As a result, the derivation path is therefore not radically altered, and no further security considerations are required.

Certified Payment Channels

Whilst digital certificates are important for enabling KYC, they can have the undesired effect of reducing the certified party's privacy. For example, an on-chain digital certificate that links somebody's real identity to a public key will allow anybody to monitor the financial activity of that person. In some cases, transacting parties may want to initially establish trust through the issuance of digital certificates, but once that trust has been established, be able to obscure their addresses from the public. Certified payment channels solve this problem by allowing a pair of entities to transact in a secure and private manner.

Setup

Alice and Bob must have keys that have been issued valid digital certificates. These are referred to as $P_{CA}^A$ and $P_{CA}^B$. The digital certificates are required so that both Alice and Bob are able to verify each other's real-world identities before creating the payment channel. The exact mechanism for issuing and referencing the digital certificates has been described above.

On Chain Method

Step 1: Alice and Bob generate a shared secret using Elliptic Curve Diffie Hellman Step 1a: Alice multiplies her secret key by Bob's public key $$P_{AB} = sk_{CA}^A \cdot P_{CA}^B$$

Step 1b: Bob multiplies his secret key by Alice's public key $$P_{BA} = sk_{CA}^B \cdot P_{CA}^A$$

Observe that $P_{BA}=P_{AB}=(P_{AB}^x, P_{AB}^y)$

Step 1c: The shared secret is the x-coordinate of the jointly derived elliptic curve point $S = P_{BA}^x = P_{AB}^x$ S can only feasibly be derived by some one who knows both a private key for Alice ($sk_{CA}^A$) and a public key for Bob ($P_{CA}^B$) or vice versa.

Step 2: The shared secret is used to generate a hash chain of secret keys $$s_1 = H(S) \bmod n$$

$$s_2 = H(s_1) \bmod n = H^2(S) \bmod n$$

$$\ldots$$

$$s_N = H(s_{N-1}) \bmod n = H^N(S) \bmod n$$

This is just one example of deterministic key generation path using the shared secret seed. Other methods such as those described in international patent application WO 2017/145016 can be used. It should also be noted that, in practice, deterministic wallets use HMAC (hash-based message authentication codes) to generate private keys. For the purposes of the present disclosure, it can be assumed that HMACO and HO are interchangeable, and that the exact function used to generate keys is an implementation detail.

Step 3: The update public keys are generated starting from the Nth secret key $$P_1 = s_N \cdot G$$

$$P_2 = s_{N-1} \cdot G$$

$$\ldots$$

$$P_N = s_1 \cdot G$$

It should be noted that the update keys are derived backwards, starting from $S_N$ and finishing with $s_1$, for added security.

Step 4: Both Alice and Bob create a sequence of indexed addresses using these update keys $$\text{Alice}: P_{Ai} = P_{CA}^A + P_i$$

$$\text{Bob}: P_{Bi} = P_{CA}^B + P_i$$

$$i \in \{1, \ldots, N\}$$

Alice and Bob now have a sequence of indexed public key addresses from which to send and receive payments. As the keys have been derived using a shared secret, the addresses in the payment channel will only be known to Alice and Bob, enabling them to establish a secure payment channel thereby ensuring privacy.

Analysis

The Certified Payment Channel algorithm combines secret sharing and deterministic key updates and its security model relies on both ECC and hash functions. Even if an attacker were able to determine the private key of a single update key ($s_k$ for $P_k$) then they would not be able to determine $s_{k+1}$ or $P_{k+1}$.

An example use case for this method of this is pay-as-you-go streaming services, such as cable tv services whereby a payment channel is set up between a subscriber and the supplier. In order to establish initial trust, the service user has to be sure that the payment addresses indeed belong to the service provider. Conversely, the service provider will need to be able to link the payments to each customer ID. For both security and flexibility purposes the Certified Payment Channel algorithm generates multiple keys for both the provider and user and ensures their transaction information, whilst on-chain, remains obscured from third-parties.

Attesting to a Certified Key

Digital Signatures

Ownership of a certified key can easily be demonstrated by proving two digital signatures: one for $P_1'$ and one for $P_1$ ($P_{A1}=P_{CA}+P'_1$). Say that Carol wants to verify that Alice is the owner of the certified public key $P_{CA}{}^A$. However, Alice does not want to sign messages directly with $sk_{CA}{}^A$. She can use the following algorithm.

Step 1: Carol sends a message M to Alice. This could be a randomly-generated bit string.

Step 2: Alice responds with two signatures for the message M:

$Sig_{P_1'}(M)$, $Sig_{P_{A1}}(M)$ where $Sig_{P_1'}(M)$ is valid for $P_1'$ and $Sig_{P_{A1}}(M)$ is valid for $P_{A1}$. If the signatures are valid this proves Alice knows $sk_{A1}$ and $sk_1'$.

Step 3: Carol can verify that $$P_{CA}{}^A = P_{A1} - P_1'$$

given $$sk_{CA}{}^A = sk_{A1} - sk_1'.$$

Carol can therefore deduce that Alice knows $sk_{CA}{}^A$.

Hash Preimage

A more efficient method for proving knowledge of $sk_{CA}{}^A$ is to provide one signature for $P_{A1}$ and the hash preimage that generates the private key for $P_1'$. It should be noted that $$P_{A1} = P_{CA}{}^A + P_1'$$

$$P_{A2} = P_{CA}{}^A + P_2'$$

with $$P_1' = H^N(S) \cdot G$$

$$P_2' = H^{N-1}(S) \cdot G$$

where N is the number of keys in the payment channel/wallet.

Algorithm (Key Attestation Method 2)

Step 1: Carol sends a message M to Alice. This could be a randomly-generated bit string.

Step 2: Alice responds by sending $H^{N-1}(S)$, and signatures $Sig_{P_{A1}}(M)$, $Sig_{A2}(M)$
where $Sig_{P_{A1}}(M)$ is valid for $P_{A1}$ and $P_1' = sk_1' \cdot G$ where $$sk_1' = H(H^{N-1}(S))$$

$$sk_2' = H^{N-1}(S)$$

All three pieces of information prove Alice knows $sk_{A1}$, $sk_1'$ and $sk_2'$.

Step 3: Carol can verify that $$P_{CA}{}^A = P_{A1} - P_1'$$

and deduce that $$P_{A2} = P_{CA}{}^A + P_2'$$

Given that $$sk_{CA}{}^A = sk_{A1} - sk_1'$$

Carol can therefore deduce that Alice knows $sk_{CA}{}^A$.

It should be noted that this method is less cryptographically secure as it reveals more private information about $P_1'$ than the previous method. However, it enables more efficient verification for Carol. Improvements in efficiency arise in that Carol can determine a chain of deterministic keys, depending on which hash preimage is provided, thereby enabling a larger number of signatures to be verified.

Zero knowledge proofs As an alternative to providing a signature to prove knowledge of $S_1'$ (and by implication $P_{CA}{}^A$), Alice can provide a zero-knowledge proof that she knows the private key $S_1'$. The zero-knowledge protocol (between Alice and Bob) to prove knowledge of $S_1'$ such that $P_1' = S_1' \cdot G$ is as follows:

Algorithm (Key Attestation Method 3)

Setup:

The publicly known shared parameters of the system are: E (group), n (order), G (EC generator point)

Figure 11:
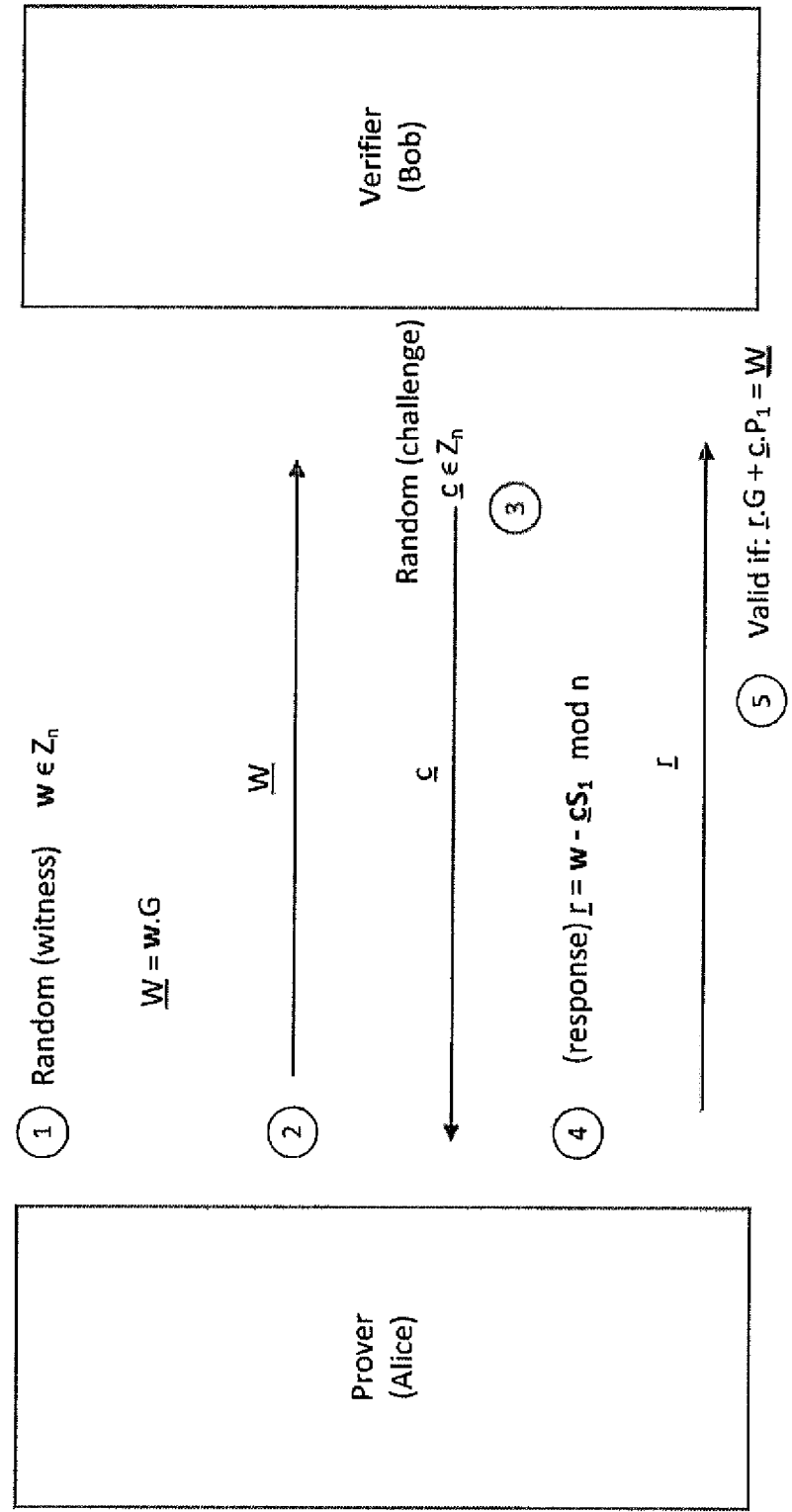
FIG. 11 shows zero knowledge proof of knowledge of a private key.

Method:
1. Alice generates a random witness (integer) $w \in \mathbb{Z}_n$ and computes $W = w \cdot G$
2. Alice sends W to Bob
3. Bob chooses a random challenge $c \in \mathbb{Z}_n$ and sends c to Alice. It should be noted that this challenge could also be a message hash
4. Alice calculates the response $r = w - c S_1'$ mod n and sends r back to Bob
5. Bob uses r, c, and W to check the equality: $r \cdot G + c \cdot P_1' = W$
   a. If True, then proof is valid
   b. If False, then proof is invalid Steps 1-5 are illustrated in FIG. 11, in which all values highlighted in bold are kept secret and all underlined values are revealed/public.

Completeness of Verification:

Given r and c it can be checked that the LHS of the equation in Step 5 is equal to the RHS $$r \cdot G + c \cdot P_1' = (w - S_1' c) \cdot G + c(S_1' \cdot G)$$
$$= w \cdot G - c S_1' \cdot G + c S_1' \cdot G$$
$$= w \cdot G = W$$

Due to the algebraic properties of finite field elliptic curves it is easy to securely mask a private key and still prove ownership using elliptic curve operations. However, the additional important feature of zero-knowledge proof for $S_1'$ is that only the issuer of the random challenge (Bob) can be convinced by the proof.

The reason for this is that the order in which W, c and r are generated/received (W→c→r) is part of the proof itself. In other words, it is easy to pick a random $r \in \mathbb{Z}_n$ and $c \in \mathbb{Z}_n$ then calculate W such that the verification equation (step 5) validates as true. As a result, Bob cannot take the data generated by Alice and convince anyone else that Alice knows $S_1'$. This is unlike a digital signature, whereby a single signature for a message can convince multiple verifiers that a signer owns the private key.

Extensions

PKI on Chain

The blockchain can be used to publicly register CA keys and a root certificate. The current three key PKI standard can easily be replicated on the blockchain using transaction inputs and outputs inherent to the blockchain architecture.

CA PKI on Chain

In this method it will be assumed that the CA has a wallet which can generate multiple private/public key pairs. A PKI for issuing digital certificates requires three keys:

the root key $P_{CA}{}^{Root}$
the subordinate key $P_{CA}{}^{Sub}$
the issuing key $P_{CA}{}^{Issue}$ The CA can use blockchain transactions to link these three keys in a hierarchy.

Figure 13:
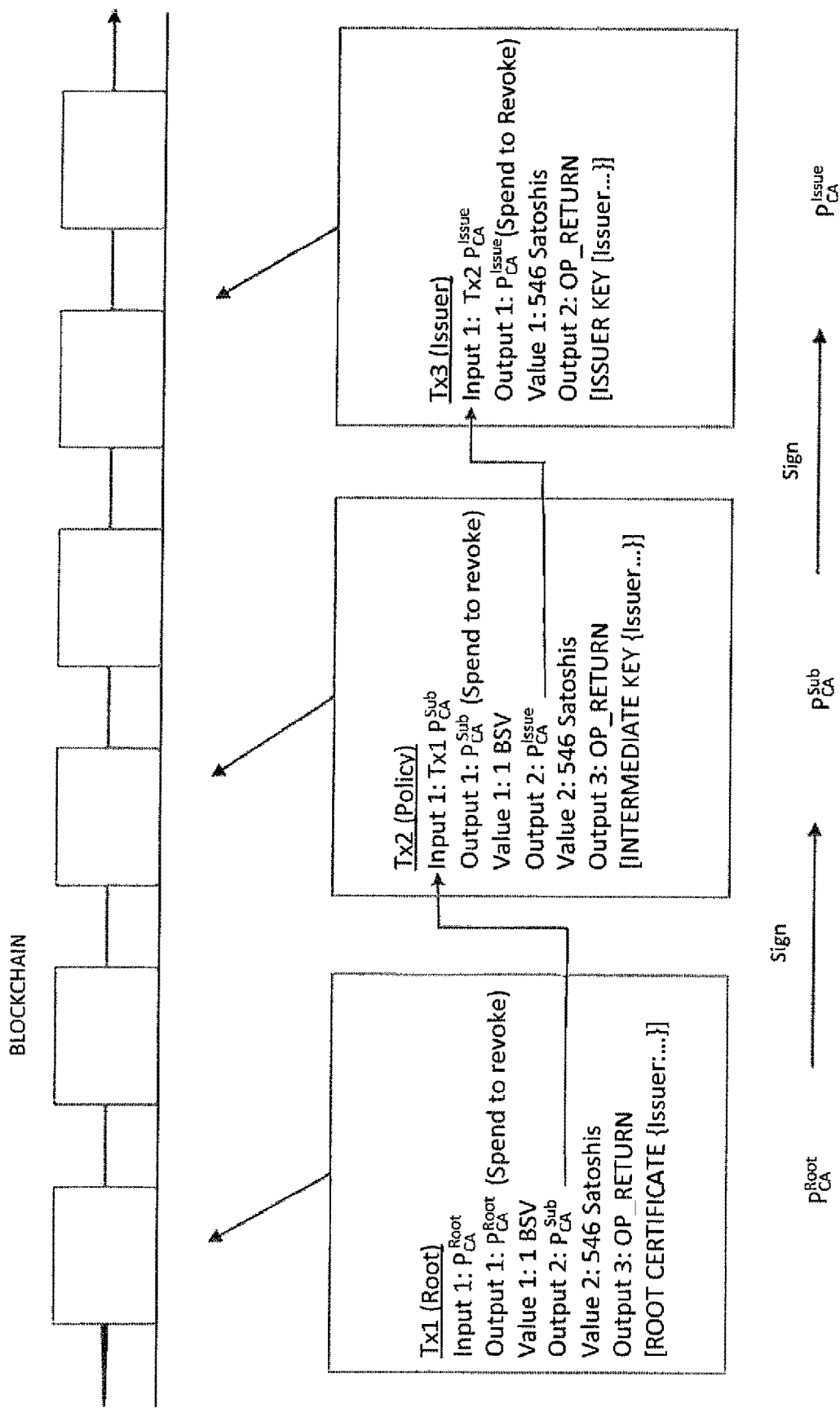
FIG. 13 shows the use of a chain of transactions on a blockchain for storing certified data.
Figure 14:
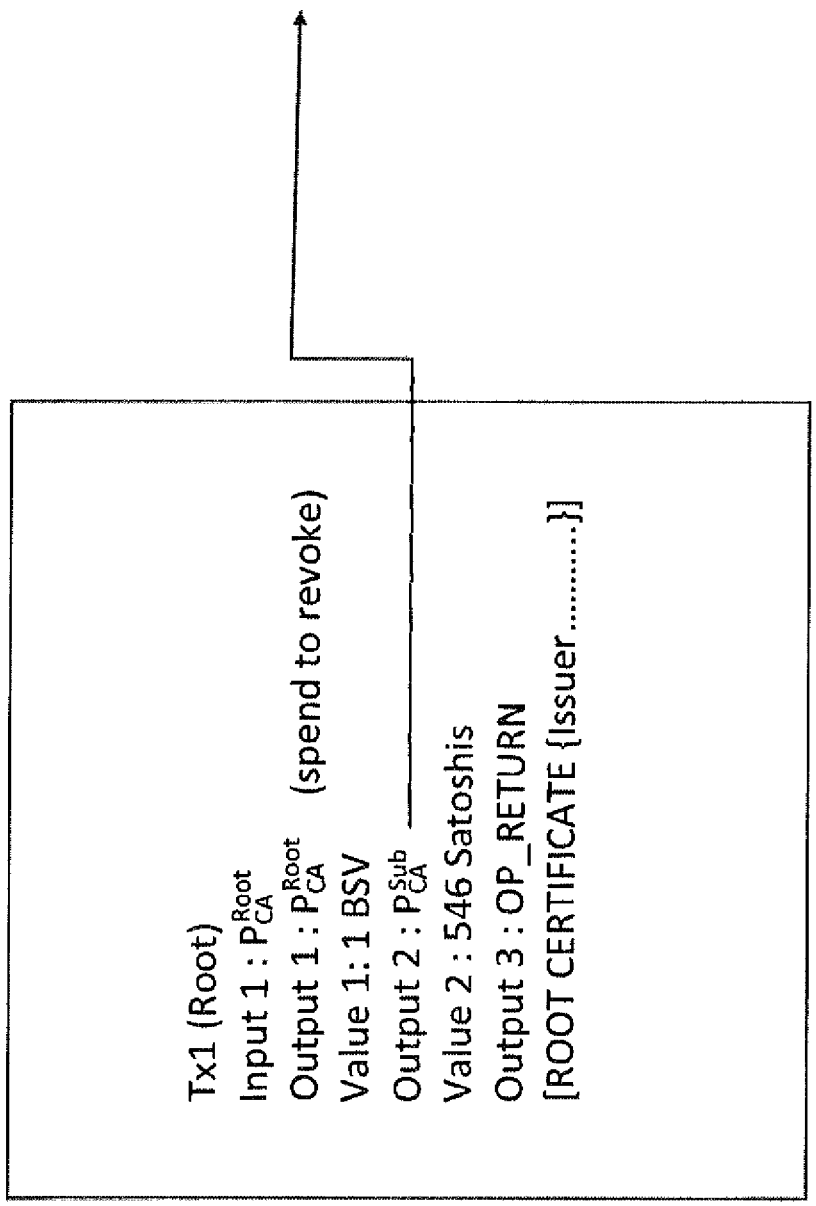
FIG. 14 shows a root transaction of the arrangement of FIG. 13.
Figure 15:
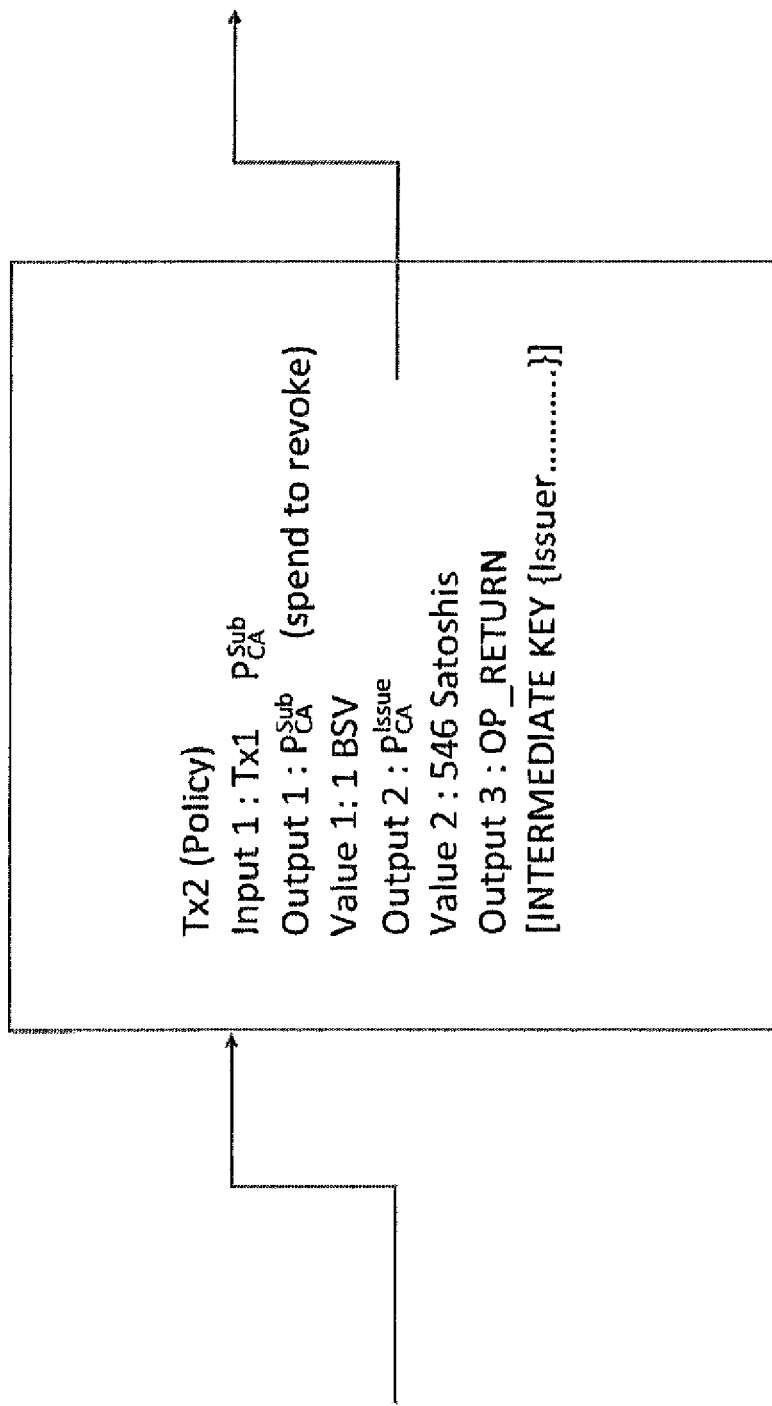
FIG. 15 shows an intermediate transaction of the arrangement of FIG. 13.

FIGS. 13 to 15 illustrate the method for using transactions on the blockchain and demonstrate the link between $P_{CA}{}^{Root}$, $P_{CA}{}^{S}$ and $P_{CA}{}^{Issue}$. The transaction that includes the key must include the root certificate in either OP_RETURN or in the ScriptPubKey itself (OP_PUSHDATAx<Certificate byte size> <Certificate>OP_DROP). As the root certificate is self-signed, it must include data that can be verified independently of the blockchain i.e. a website for the CA where the root public key can be found.

Registration:

Step 1: The CA creates a transaction as shown in FIG. 14, Tx1, with one input signed by $P_{CA}^{Root}$ and three outputs. One output can be spent by $P_{CA}^{Root}$ and provides a revoke tool. A second output is a P2PK (Pay-to-public-key) that contains the subordinate key, $P_{CA}^{Sub}$. It should be noted that this is the equivalent of signing the subordinate key. The third output is an OP_RETURN that contains a serialised form of the root certificate Step 2: To register $P_{CA}^{Sub}$ the CA creates a transaction as shown in FIG. 15, Tx2, with one input signed by $P_{CA}^{Sub}$ that spends the second output from Tx1. Tx2 has 3 outputs. The first output can be spent by $P_{CA}^{Sub}$ and provides a revoke tool. A second output is a P2PK (Pay-to-public-key) that contains the subordinate key, $P_{CA}^{Issue}$. It should be noted that this is the equivalent of signing the issuing key and provably links the issuing key to the root key. The third output is an OP_RETURN that contains a serialised form of the intermediate key registration certificate.

Step 3: As a final step the CA registers $P_{CA}^{Issue}$ by creating Tx3, which is shown in FIG. 13, with one input signed by $P_{CA}^{Issue}$ that spends the second output from Tx2. Tx3 has two outputs. The first can be spent by $P_{CA}^{Issue}$ in the case of key revocation. The second is an OP_RETURN containing a serialised form of the issuing key registration certificate including CA data.

Step 4: All three transactions are published on the blockchain. Corresponding unspent outputs can be found in the UTXO set. Together the transactions form a blockchain PKI chain of trust.

The root certificate metadata is contained in the OP_RETURN of Tx1. The entire Tx (including the OP_RETURN data) is signed by the root key. The intermediate certificate metadata is contained in the OP_RETURN of Tx2 and signed by the subordinate key.

Verification:

For any subsequent transaction that requires approval by a digital certificate, the proof of registration then becomes a 108-byte reference to 3 outpoints in the UTXO set. From this reference anyone can construct a path that links $P_{CA}^{Issue}$ (via the blockchain) to $P_{CA}^{Root}$ and a root certificate, which in turn can be associated with a trusted CA.

Step 1: The verifier checks that output 1 from each transaction (Tx1-3) is in the UTXO set. If any of the three outpoints are not present, then the validation fails.

Step 2: The verifier then requests the full transaction data for Tx1-3 and checks
  I. The input for Tx3 spends output 2 from Tx2
  II. The input for Tx2 spends output 2 from Tx1

Step 3: The verifier then parses the data in the OP_RETURN of Tx1 to investigate the root certificate (the actual method for encoding a digital certificate into hex data is not described here but there are many methods that exist).

The root certificate forms the basis of trust and is made trustworthy by some off-block mechanism. Information about the CA along with non-blockchain related security data should be included here.

Revocation

To revoke any key within the PKI hierarchy the CA simply needs to spend output 1 from the transaction signed by that key. This will remove any reference to the transaction containing the evidence of registration from the UTXO set and hence the verification of the key by searching the UTXO set will fail.

It should be noted that the revocation of any key within the hierarchy will result in the revocation of all keys further down. This is because the removal of any registration Tx reference from the UTXO set breaks the link from that key to the root key and root certificate.

Analysis

Combining UTXO membership and OP_RETURN outputs and signatures for blockchain transactions provides a secure and inexpensive way of mapping key/certificate hierarchies onto the blockchain. FIG. 16 shows a list of key fields for the certificates in the CA chain of trust and their analogues within Tx's in the blockchain PKI. FIG. 13 shows the chain of trust in the blockchain PKI.

Use Case

Specialised SPV (Simplified Payment Verification) Nodes

Enabling users to link wallets to 'real-world' identity data opens up the possibility of establishing specialised SPV nodes that can provide services in exchange for digital assets. The Tokenized protocol, for example has specialised node software that processes requests and issues responses in the form of blockchain transactions, but whose primary task is the automated management of token assets.

A specialized SPV node can easily identify itself to a customer at the beginning of any interaction by providing a digital signature and a reference to its CTX. As a result, the customer is always able to independently verify the authenticity of the public key used by this node. This is especially important if interactions require high value transfers or the information being sent to the specialised node is sensitive.

Say for example a service provider (Sam) wants to be able to identify himself to a customer (Carol). A high-level description of the method is as follows.

Identity Verification for Service Providers

Step 1: The issuing CA creates a CTX linking Sam to his public key. This certificate contains Sam's identity data along with references to the certificate authorities PKI hierarchy. It is assumed that the certificate issuer is a trusted third party and everyone can authenticate the issuer's root certificate.

Step 2: Carol begins the interaction with Sam by sending him an arbitrary (random) message.

Step 3: To identify themselves the service provider provides an ECDSA signature for the message sent by Carol along with a 32-byte TXID referencing the CTX.

Figure 17:
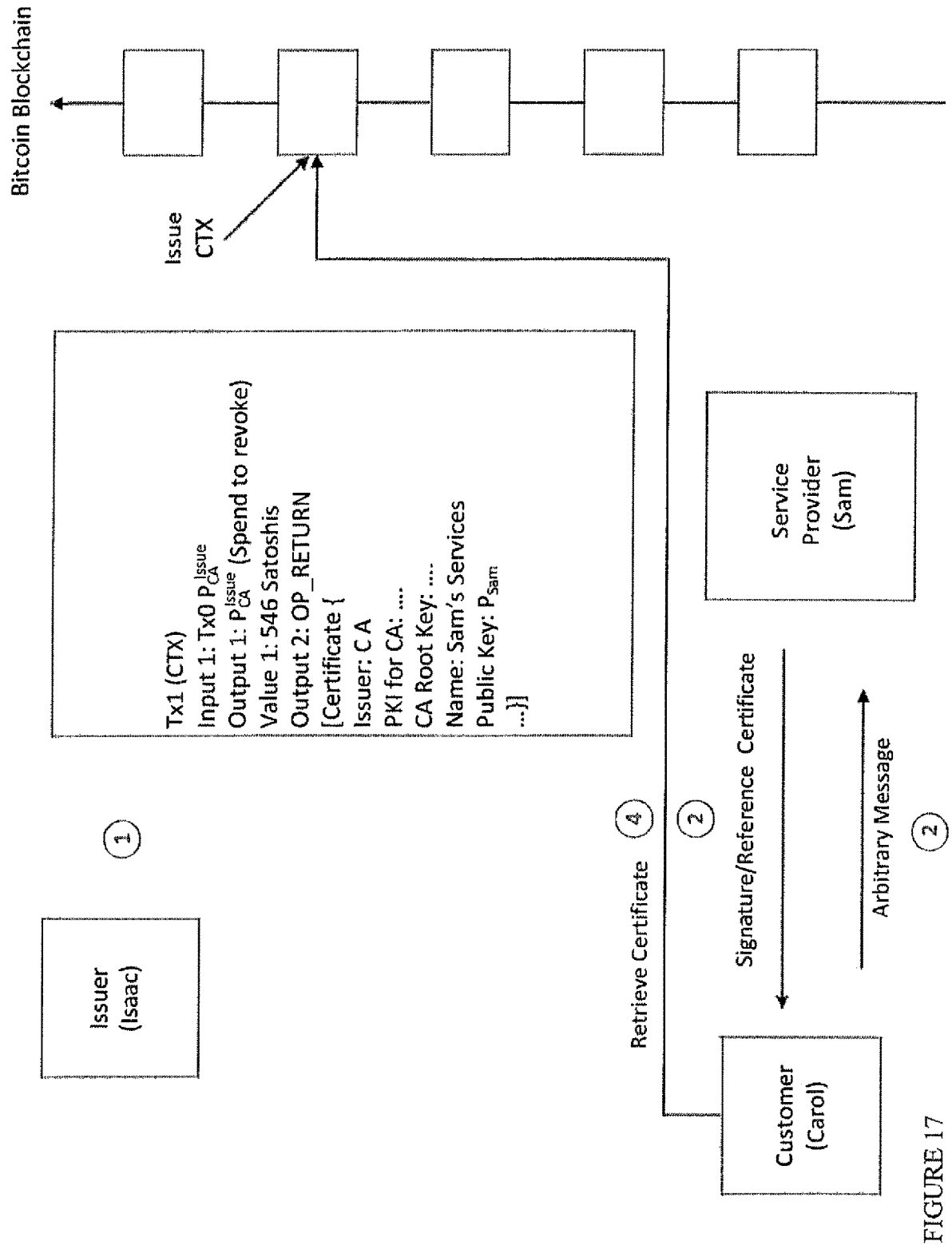
FIG. 17 shows process for creating and referencing a digital certificate for a service provider.

Step 4: Carol can verify Sam's identity by retrieving the CTX and checking the signature using the public key in the digital certificate The method is illustrated in FIG. 17 below.

Figure 18:
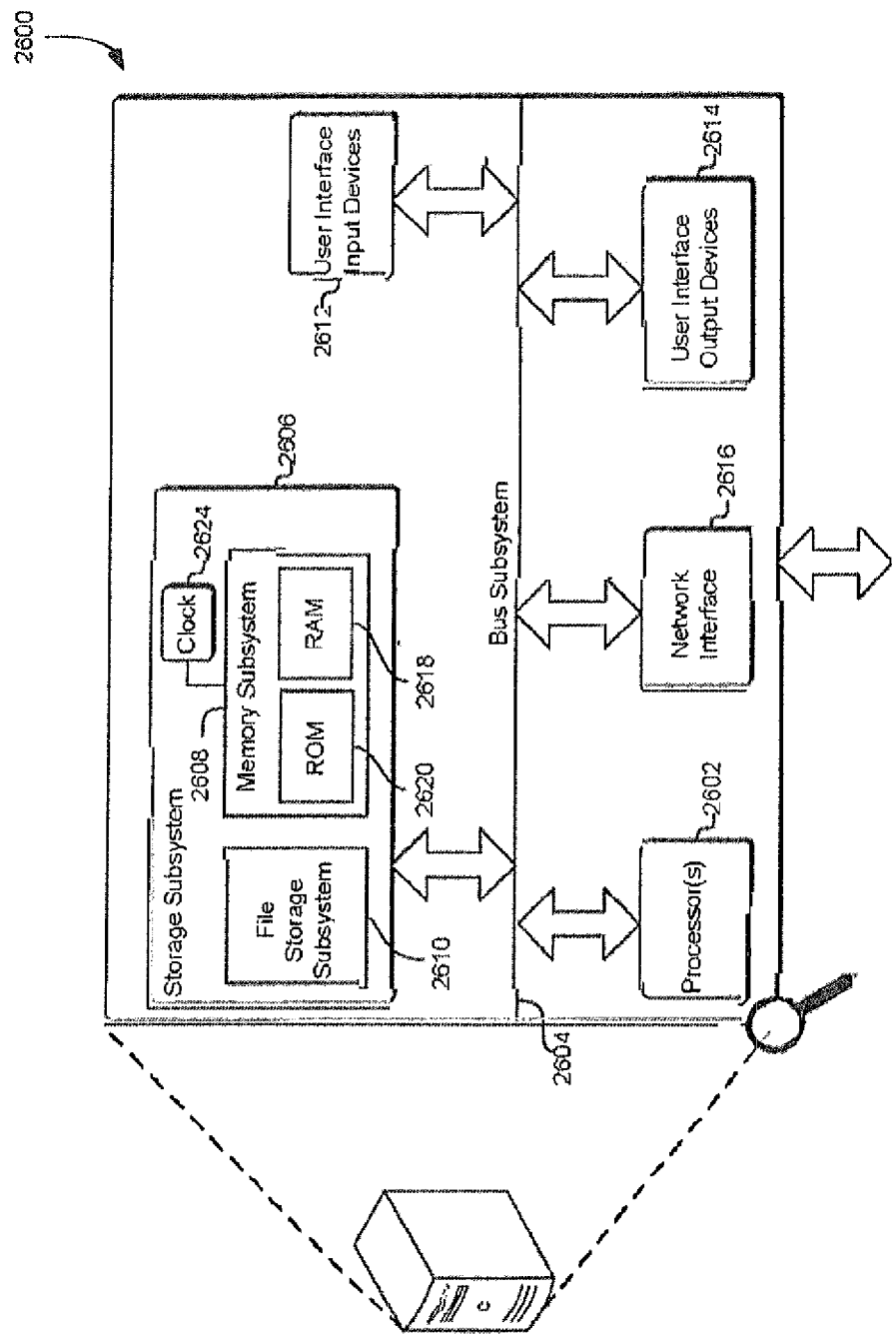
FIG. 18 is a schematic diagram illustrating a computing environment in which various embodiments can be implemented.

Turning now to FIG. 18, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 18, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 18 is intended only as a specific example for purposes of illustrating the preferred embodiment of the device. Many other configurations having more or fewer components than the system depicted in FIG. 18 are possible.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

ENUMERATED EXAMPLE EMBODIMENTS

Examples of the embodiments of the present disclosure can be described in view of the following clauses:

1. A method of storing certified data on a blockchain, the method comprising:—generating a first blockchain transaction, wherein a first output of said first blockchain transaction contains first data based on a first public key of a first private/public key pair, comprising a first private key and a first public key, of a cryptography system, the first blockchain transaction contains a first digital signature signed by means of a second private key of a second private/public key pair, comprising a second private key and a second public key, of a cryptography system, and the first digital signature has an input containing second data related to said first public key; and broadcasting the first blockchain transaction to the blockchain.

2. A method according to clause 1, further comprising generating at least one second blockchain transaction, wherein a first output of said second blockchain transaction contains third data based on a third public key of a third private/public key pair, comprising a third private key and a third public key, of a cryptography system, the second blockchain transaction contains a second digital signature signed by means of a fourth private key of a fourth private/public key pair, comprising a fourth private key and a fourth public key, of a cryptography system, and the second digital signature has an input containing fourth data related to said third public key; and
broadcasting the second blockchain transaction to the blockchain.

3. A method according to clause 2, wherein the first output of the second blockchain transaction contains the third data, the fourth data and the second digital signature, and the second digital signature has an input containing the third data.

4. A method according to clause 2 or 3, wherein an input of the second blockchain transaction corresponds to an output of the first blockchain transaction.

5. A method according to clause 4, wherein said input of said second blockchain transaction contains a digital signature signed by means of the second private key.

6. A method according to any one of clauses 2 to 5, wherein the fourth data is derived by applying a one-way function to data included in the first output of the second blockchain transaction and related to the third public key.

7. A method according to any one of clauses 2 to 6, wherein a second output of said second blockchain transaction is spendable by means of a private key corresponding to a predetermined public key, wherein said predetermined public key is different from said fourth public key.

8. A method according to any one of clauses 2 to 7, further comprising generating at least one further public/private key pair from the third public/private key pair and a deterministic private/public key pair.

9. A method according to any one of clauses 2 to 8, wherein a third output of the second blockchain transaction is spendable by means of a private key corresponding to a predetermined public key.

10. A method according to clause 9, wherein the third output of the second blockchain transaction is time-locked.

11. A method according to any one of clauses 2 to 10, wherein the first public key and the fourth public key are a same public key.

12. A method according to any one of clauses 2 to 10, wherein the second public key and the fourth public key are a same public key.

13. A method according to any one of clauses 2 to 12, wherein said third data is derived by applying a one-way function to data including said third public key.

14. A method according to any one of the preceding clauses, wherein said first data is derived by applying a one-way function to data including said first public key.

15. A method according to any one of the preceding clauses, further comprising generating an updated first blockchain transaction, wherein a first output of the updated first blockchain transaction contains updated first data based on an updated first public key, the updated first blockchain transaction contains an updated first digital signature signed by means of said second private key, and the updated first digital signature has an input containing updated second data related to said updated first public key; and broadcasting said updated first blockchain transaction to the blockchain.

16. A method according to clause 15, wherein the first output of the updated first blockchain transaction contains the updated first data, the updated second data and the updated first digital signature, and the updated first digital signature has an input containing the updated second data.

17. A method according to any one of the preceding clauses, wherein the first output of the first blockchain transaction contains the first data, the second data and the first digital signature, and the first digital signature has an input containing said second data.

18. A method according to any one of the preceding clauses, wherein the second data is derived by applying a one-way function to data included in the first output of the first blockchain transaction and related to the first public key.

19. A method according to any one of the preceding clauses, wherein a second output of said first blockchain transaction is spendable by means of a private key corresponding to a predetermined public key, wherein said predetermined public key is different from said second public key.

20. A method according to any one of the preceding clauses, wherein at least one said first output is an unspendable output.

21. A method according to any one of the preceding clauses, wherein a first input of the first blockchain transaction contains a digital signature signed by means of the second private key.

22. A method according to any one of the preceding clauses, wherein a second output of said first blockchain transaction is spendable by means of a private key corresponding to a predetermined public key.

23. A method according to clause 22, wherein the second output of the first blockchain transaction is time-locked.

24. A method according to any one of the preceding clauses, wherein a third output of said first blockchain transaction is spendable by means of a private key corresponding to a predetermined public key, wherein said predetermined public key is different from said second public key.

25. A method according to any one of the preceding clauses, further comprising generating at least one further public/private key pair from the first public/private key pair and a deterministic private/public key pair.

26. A method according to clause 8 or 25, further comprising providing digital signatures signed by means of at least one said further private key and by means of the corresponding deterministic private key.

27. A method according to clause 8 or 25, further comprising providing a digital signature signed by means of at least one said further private key and providing data related to het corresponding deterministic private key.

28. A method according to clause 27, wherein the corresponding deterministic private key is derived by applying a one-way function to the data related to the corresponding deterministic private key.

29. A method according to clause 8 or any one of clauses 25 to 28, further comprising providing proof of knowledge of a said deterministic private key to a verifier, based on an encrypted version of the deterministic key, and on a value selected by the verifier.

30. A method according to any one of the preceding clauses, further comprising sharing a secret value between first and second parties based on a private key of the first party and a public key of the second party, wherein the secret can also be determined from the public key of the first party and the private key of the second party.

31. A method according to any one of the preceding clauses, further comprising generating a plurality of deterministic keys by means of repeated application of a one-way function to data.

32. A method according to clause 31, wherein a private key to be updated is based on application of a one-way function to the updated key.

33. A method according to any one of the preceding clauses, wherein the first output of the first blockchain transaction includes location data for indicating location of data off-chain.

34. A method of verifying certified data stored in a blockchain transaction, the method comprising:
identifying (i) first data based on a first public key of a first private/public key pair, comprising a first private key and a first public key, of a cryptography system and (ii) a first digital signature, stored in a blockchain transaction, wherein a first output of said blockchain transaction contains said first data, said first digital signature is signed by means of a second private key of a second private/public key pair, comprising a second private key and a second public key, of a cryptography system, and the first digital signature has an input containing second data related to said first public key; and verifying said first digital signature by means of said second public key.

35. A method according to clause 34, wherein the first output of the blockchain transaction contains the first data, the second data and the first digital signature, and the first digital signature has an input containing said first data.

36. A method according to clause 34 or 35, wherein at least one said first output is an unspendable output and the method further comprises identifying said first digital signature and said first public key from said unspendable output.

37. A method according to any one of clauses 34 to 36, wherein the second data is derived by applying a one-way function to data included in the first output of the blockchain transaction and related to the first public key, and the method further comprises identifying said second data and said data included in the first output, and applying said one-way function to said data included in the first output and verifying that the resulting data corresponds to said first data.

38. A method according to any one of clauses 34 to 37, further comprising identifying said blockchain transaction by means of identification data on the blockchain corresponding to said transaction.

39. A method according to any one of clauses 34 to 38, wherein said first data is derived by applying a one-way function to data based on said first public key.

40. A method according to any one of clauses 34 to 39, further comprising determining whether the blockchain transaction is unspent.

41. A method according to any one of clauses 34 to 40, wherein said first digital signature is verified by means of said second public key subsequently to submission of the blockchain transaction to a blockchain.

42. A method of sharing a public key of a cryptography system between a first participant and a second participant, wherein the first participant has a first private key of a first private/public key pair comprising the first private key and a first public key of a cryptography system having a homomorphic property, the second participant has a second private key of a second private/public key pair comprising the second private key and a second public key of the cryptography system, a first digital signature is signed by means of a third private key, the first digital signature has an input containing first data related to said first public key, a second digital signature is signed by means of the third private key, and the second digital signature has an input containing second data related to said second public key, the method comprising:
determining, by said first participant, a common secret by means of said first private key and said second public key, wherein said common secret can also be determined by means of said second private key and said first public key; and
determining, by said first participant, at least one further public key of the cryptography system based on the first public key and the common secret.

43. A method according to clause 42, wherein the cryptography system is an elliptic curve cryptography system or a cryptography system based on a digital signature algorithm.

44. A method according to clause 42 or 43, wherein at least one said further public key is determined based on the first public key and a deterministic key determined by means of application of a deterministic function to data based on the common secret.

45. A method according to clause 44, wherein the deterministic function is a one-way function.

46. A method according to clause 44 or 45, further comprising determining a plurality of said further public keys from said first public key and a plurality of deterministic keys determined by means of repeated application of the deterministic function to data based on the common secret.

47. A method according to any one of clauses 44 to 46, further comprising proving ownership of the first private key by providing a digital signature signed by means of a private key corresponding to at least one said further public key and providing data related to at least one corresponding said deterministic key.

48. A method according to clause 47, wherein a private key corresponding to at least one said deterministic key is derived by applying a one-way function to the data related to the corresponding said deterministic key.

49. A method according to any one of clauses 42 to 48, further comprising proving ownership of said first private key by means of a zero knowledge proof.

50. A method according to any one of clauses 42 to 49, further comprising proving ownership of said first private key by providing a pair of digital signatures based on respective private keys of a cryptography system having a homomorphic property, wherein said respective private keys are related to each other by said first private key.

51. A method according to any one of clauses 42 to 50, wherein a first said digital signature is contained in a first blockchain transaction.

52. A method according to any one of clauses 42 to 51, wherein a second said digital signature is contained in a second blockchain transaction.

53. A method of generating at least one private key of a cryptography system, wherein a first digital signature is signed by means of a second private key, and the first digital signature has an input containing first data related to a first public key of a first private/public key pair comprising a first private key and said first public key of a cryptography system having a homomorphic property, the method comprising generating at least one third private key of the cryptography system based on the first private key and a deterministic private key.

54. A method according to clause 53, wherein the cryptography system is an elliptic curve cryptography system or a cryptography system based on a digital signature algorithm.

55. A method according to clause 53 or 54, wherein at least one said deterministic private key is determined by means of application of a deterministic function to data.

56. A method according to clause 55, wherein the deterministic function is a one-way function.

57. A method according to clause 55 or 56, further comprising determining a plurality of said deterministic keys determined by means of repeated application of the deterministic function to data.

58. A method according to any one of clauses 53 to 57, further comprising proving ownership of said first private key by providing a digital signature signed by means of at least one said third private key and providing data related to at least one corresponding said deterministic private key.

59. A method according to any one of clauses 53 to 58, further comprising proving ownership of said first private key by means of a zero knowledge proof.

60. A method according to any one of clauses 53 to 59, further comprising proving ownership of said first private key by providing a pair of digital signatures based on respective private keys of a cryptography system having a homomorphic property, wherein said respective private keys are related to each other by said first private key.

61. A method according to clause 60, wherein a first said digital signature is contained in a first blockchain transaction.

62. A method according to clause 60 or 61, wherein a second said digital signature is contained in a second blockchain transaction.

63. A computer implemented system comprising;
a processor; and
memory including executable instructions that, as a result of execution by the processor, causes the system to perform any embodiment of the computer implemented method as claimed in any one of clauses 1 to 62.

64. A non-transitory computer readable storage medium having stored thereon executable instructions that, as a result of being executed via processor of a computer system, cause the computer system to at least perform an embodiment of the method as claimed in any one of clauses 1 to 62.

The invention claimed is:

1. A method of storing certified data on a blockchain, the method comprising:
generating a first blockchain transaction, wherein:
a first output of said first blockchain transaction contains a certification of first data based on a first public key of a first private/public key pair, comprising a first private key and the first public key, of a cryptography system,
the first blockchain transaction contains a first digital signature signed by means of a second private key of a second private/public key pair, comprising the second private key and a second public key, of a cryptography system,
a second output of said first blockchain transaction is spendable by means of a private key different from said first and second private key, and
the first digital signature has an input containing second data related to said first public key; and
broadcasting the first blockchain transaction to the blockchain;

wherein the certification of said first data is valid when the second output is included in a set of unspent transaction outputs, and is revoked by spending said second output.

2. The method of claim 1, further comprising:
generating at least one second blockchain transaction, wherein a first output of said second blockchain transaction contains third data based on a third public key of a third private/public key pair, comprising a third private key and the third public key, of a cryptography system, the second blockchain transaction contains a second digital signature signed using a fourth private key of a fourth private/public key pair, comprising the fourth private key and a fourth public key, of a cryptography system, and the second digital signature has an input containing fourth data related to said third public key; and
broadcasting the second blockchain transaction to the blockchain.

3. The method of claim 2, wherein the first output of the second blockchain transaction contains the third data, the fourth data and the second digital signature, and the second digital signature has an input containing the third data.

4. The method of claim 2, wherein an input of the second blockchain transaction corresponds to an output of the first blockchain transaction.

5. The method of claim 4, wherein said input of said second blockchain transaction contains a digital signature signed using the second private key.

6. The method of claim 2, wherein the fourth data is derived by applying a one-way function to data included in the first output of the second blockchain transaction and related to the third public key.

7. The method of claim 2, wherein the second output of said second blockchain transaction is spendable by means of a private key corresponding to a predetermined public key, wherein said predetermined public key is different from said fourth public key.

8. The method of claim 2, further comprising generating at least one further public/private key pair from the third public/private key pair and a deterministic private/public key pair.

9. The method of claim 8, further comprising providing digital signatures signed by means of at least one said further private key and by means of the corresponding deterministic private key.

10. The method of claim 8, further comprising providing a digital signature signed by means of at least one said further private key and providing data related to the corresponding deterministic private key.

11. The method of claim 10, wherein the corresponding deterministic private key is derived by applying a one-way function to the data related to the corresponding deterministic private key.

12. The method of claim 8, further comprising providing proof of knowledge of a said deterministic private key to a verifier, based on an encrypted version of the deterministic key, and on a value selected by the verifier.

13. The method of claim 2, wherein a third output of the second blockchain transaction is spendable by means of a private key corresponding to a predetermined public key.

14. The method of claim 13, wherein the third output of the second blockchain transaction is time-locked.

15. The method of claim 2, wherein the first public key and the fourth public key are a same public key.

16. The method of claim 2, wherein the second public key and the fourth public key are a same public key.

17. The method of claim 2, wherein said third data is derived by applying a one-way function to data including said third public key.

18. The method of claim 1, wherein said first data is derived by applying a one-way function to data including said first public key.

19. The method of claim 1, further comprising generating an updated first blockchain transaction, wherein a first output of the updated first blockchain transaction contains an updated certification of the first data based on an updated first public key, the updated first blockchain transaction contains an updated first digital signature signed using said second private key, and the updated first digital signature has an input containing updated second data related to said updated first public key; and broadcasting said updated first blockchain transaction to the blockchain.

20. The method of claim 19, wherein the first output of the updated first blockchain transaction contains the updated certification of the first data, the updated second data and the updated first digital signature, and the updated first digital signature has an input containing the updated second data.

21. The method of claim 1, wherein the first output of the first blockchain transaction contains the certification of the first data, the second data and the first digital signature, and the first digital signature has an input containing said second data.

22. The method of claim 1, wherein the second data is derived by applying a one-way function to data included in the first output of the first blockchain transaction and related to the first public key.

23. The method of claim 1, wherein at least one said first output is an unspendable output.

24. The method of claim 1, wherein a first input of the first blockchain transaction contains a digital signature signed using the second private key.

25. The method of claim 1, wherein the second output of the first blockchain transaction is time-locked.

26. The method of claim 1, wherein a third output of said first blockchain transaction is spendable by means of a private key corresponding to a predetermined public key, wherein said predetermined public key is different from said second public key.

27. The method of claim 1, further comprising generating at least one further public/private key pair from the first public/private key pair and a deterministic private/public key pair.

28. The method of claim 27, further comprising providing a digital signature signed by means of at least one said further private key and providing data related to the corresponding deterministic private key.

29. The method of claim 28, wherein the corresponding deterministic private key is derived by applying a one-way function to the data related to the corresponding deterministic private key.

30. The method of claim 27, further comprising providing proof of knowledge of a said deterministic private key to a verifier, based on an encrypted version of the deterministic key, and on a value selected by the verifier.

31. The method of claim 1, further comprising sharing a secret value between first and second parties based on a private key of the first party and a public key of the second party, wherein the secret can also be determined from the public key of the first party and the private key of the second party.

32. The method of claim 1, further comprising generating a plurality of deterministic keys by means of repeated application of a one-way function to data.

33. The method of claim 32, wherein a private key to be updated is based on application of a one-way function to the updated key.

34. The method of claim 1, wherein the first output of the first blockchain transaction includes location data for indicating location of data off-chain.

35. A non-transitory computer readable storage medium having stored thereon executable instructions that, as a result of being executed via processor of a computer system, cause the computer system to perform a method of storing certified data on a blockchain, the method comprising:— generating a first blockchain transaction, wherein:
a first output of said first blockchain transaction contains a certification of first data based on a first public key of a first private/public key pair, comprising a first private key and the first public key, of a cryptography system,
the first blockchain transaction contains a first digital signature signed by means of a second private key of a second private/public key pair, comprising the second private key and a second public key, of a cryptography system,
a second output of said first blockchain transaction is spendable by means of a private key different from said first and second private key, and
the first digital signature has an input containing second data related to said first public key; and
broadcasting the first blockchain transaction to the blockchain;
wherein the certification of said first data is valid when the second output is included in a set of unspent transaction outputs, and is revoked by spending said second output.

36. A computer implemented system, comprising;
a processor; and
memory including executable instructions that, as a result of execution by the processor, causes the system to perform a method of storing certified data on a blockchain, the method comprising:—
generating a first blockchain transaction, wherein:
a first output of said first blockchain transaction contains a certification of first data based on a first public key of a first private/public key pair, comprising a first private key and the first public key, of a cryptography system,
the first blockchain transaction contains a first digital signature signed by means of a second private key of a second private/public key pair, comprising the second private key and a second public key, of a cryptography system,
a second output of said first blockchain transaction is spendable by means of a private key different from said first and second private key, and
the first digital signature has an input containing second data related to said first public key; and
broadcasting the first blockchain transaction to the blockchain;
wherein the certification of said first data is valid when the second output is included in a set of unspent transaction outputs, and is revoked by spending said second output.

* * * * *